United States Patent
Ganth

(10) Patent No.: US 12,379,880 B2
(45) Date of Patent: Aug. 5, 2025

(54) COMPOSABLE INFRASTRUCTURE MODULE

(71) Applicant: Rajiv Ganth, Bangalore (IN)

(72) Inventor: Rajiv Ganth, Bangalore (IN)

(73) Assignee: CIMWARE TECHNOLOGIES PVT LTD., Bangalore (IN)

( * ) Notice: Subject to any disclaimer, the term of this patent is extended or adjusted under 35 U.S.C. 154(b) by 119 days.

(21) Appl. No.: 18/335,182

(22) Filed: Jun. 15, 2023

(65) Prior Publication Data

US 2024/0402949 A1    Dec. 5, 2024

(51) Int. Cl.
G06F 3/06    (2006.01)

(52) U.S. Cl.
CPC .......... G06F 3/0689 (2013.01); G06F 3/0605 (2013.01); G06F 3/0644 (2013.01)

(58) Field of Classification Search
CPC .... G06F 3/0689; G06F 3/0605; G06F 3/0644; G06F 13/4027; G06F 9/45558; G06F 13/102; G06F 2009/45579
See application file for complete search history.

(56) References Cited

U.S. PATENT DOCUMENTS

| | | | |
|---|---|---|---|
| 2015/0143016 A1* | 5/2015 | Egi | G06F 13/24 710/313 |
| 2016/0026592 A1 | 1/2016 | Ganth et al. | |
| 2016/0380886 A1* | 12/2016 | Blair | H04L 45/50 370/254 |
| 2018/0239649 A1* | 8/2018 | Druzhinin | G06F 3/0665 |
| 2019/0026154 A1* | 1/2019 | Desai | G06F 9/4856 |
| 2020/0301873 A1* | 9/2020 | Borikar | G06F 13/4022 |
| 2024/0281047 A1* | 8/2024 | Monserrat | G06F 9/526 |

OTHER PUBLICATIONS

Non-Transparent Bridging Simplified, https://docs.broadcom.com/doc/12353427, 2004 PLX Technology, Inc. (Year: 2004).*

* cited by examiner

*Primary Examiner* — Michael Krofcheck
(74) *Attorney, Agent, or Firm* — Ashok Tankha

(57) ABSTRACT

A composable infrastructure module (CIM) with converged functionalities of a network switch, a network interface controller, a software-defined network, a storage virtualisation controller, software-defined storage, redundant array of independent disks (RAID) features, and a composable infrastructure is provided. The CIM includes at least one processor, non-transparent bridge (NTB) devices, an Ethernet switch function, network interface functions, a compose application, and a volume manager module. Each NTB device establishes peripheral component interconnect express (PCIe) connectivity between the processor(s) and multiple nodes and between the nodes, and transfers data therebetween. The Ethernet switch function provides Ethernet connectivity to a spine switch. The volume manager module creates RAID volumes by utilizing storage resources. The compose application selectively pools and extends availability of disaggregated compute, network, and storage resources as direct attached devices on demand.

15 Claims, 13 Drawing Sheets

COMPOSABLE INFRASTRUCTURE MODULE

CROSS-REFERENCE TO RELATED APPLICATIONS

This application claims priority to and the benefit of the non-provisional patent application titled "Composable Infrastructure Module", application No. 202341038229, filed in the United States Patent and Trademark Office on Jun. 3, 2023. The specification of the above referenced patent application is incorporated herein by reference in its entirety.

FIELD OF THE INVENTION

The present invention, in general, relates to a networking device. More particularly, the present invention relates to a composable infrastructure module that is a composable network appliance with converged functionalities of a network switch, for example, a top-of-rack (ToR) switch, a network interface controller, a software-defined network, a storage virtualisation controller, software-defined storage, redundant array of independent disks (RAID) features, and a composable infrastructure thereon.

BACKGROUND OF THE INVENTION

With the increase in compute, storage, and networking requirements, ever-increasing data throughput of networks, complexities of these networks, and dependencies on these networks, substantial networking delays are induced in more locations and more physical hardware is required, which increases costs, space requirements, and power requirements in data centres. A typical data centre is a physical facility configured to house a significant amount of compute, network, storage, and infrastructure equipment, for example, networked computers, servers, storage systems, power systems, routers, switches, firewalls, controllers, environmental control systems, etc. The data centre provides shared access to data and applications using a complex compute, network, and storage infrastructure.

In a data centre, compute, network, and storage devices are typically converged into one hyperconverged server. Multiple hyperconverged servers are typically housed in a single rack of a data centre. The rack is the building block of the data centre. The rack is configured to hold, stack, organize, and secure multiple converged servers. These converged servers are typically connected to one or more in-rack network switches, for example, top-of-rack (ToR) switches, positioned on the top of the rack of the data centre for easy accessibility and reduced cabling complexity, by on-board network interface controllers. A network interface controller (NIC) is a physical device that is typically present in every host, server, machine, etc., in the rack, and that is configured to send Ethernet frames from a host central processing unit (CPU) over Ethernet cables to a destination, for example, a network switch. The ToR switch in each rack of the data centre connects to each converged server in the rack. Any allocation and provisioning of compute, network, and storage devices of the hyperconverged servers typically goes through multiple layers of software and hardware comprising, for example, device emulation software, multiple filesystem drivers, device drivers, physical hardware, etc. Such device provisioning demands high compute power and increases the latency of device interaction. Moreover, device provisioning requires more converged nodes, large space requirements, and high electrical power.

In an exemplarily implementation, the top-of-rack (ToR) switch constitutes a leaf layer of a spine-leaf network architecture. The spine-leaf network architecture is a two-layer, full mesh, data centre network topology comprising a spine layer and the leaf layer. The spine layer performs routing and operates as a core of a network. The leaf layer aggregates traffic from the hyperconverged servers contained in the rack of the data centre and connects them to the spine layer. In a typical rack of a data centre, nodes or host servers comprising, for example, central processing units (CPUs), graphics processing units (GPUs), and storage devices, are connected to the ToR switch, for example, a ToR Ethernet switch, using Ethernet cables. To connect each host server to the ToR switch using an Ethernet cable, each host server typically includes a network interface controller or an Ethernet host adapter card therewithin, which adds to the physical hardware in the rack, thereby adding to cost, power, and thermals. Moreover, installation of the Ethernet host adapter card in each host server of the rack produces substantially high software overhead when sharing devices over an ether network, for example, in applications of network file storage (NFS), non-volatile memory express over fabrics (NVMe-oF), etc.

Furthermore, each host server in the rack typically includes an on-board network interface controller (NIC) for establishing network connectivity to the top-of-rack (ToR) switch. There is a need for substantially removing conventional networking hardware on the host servers in the rack of the data centre for substantially reducing latency and saving costs and space in the data centre. Furthermore, there is a need for a wider bandwidth communication mechanism, for example, a peripheral component interconnect express (PCIe) protocol, with faster connectivity and less overheads compared to Ethernet connectivity that is typically used for sharing compute, network, and storage devices across the rack and that is used between the host servers contained in the rack and the ToR switch. PCIe is a high-speed serial computer expansion bus standard configured to replace previous bus standards, for example, peripheral component interconnect (PCI), peripheral component interconnect extended (PCI-X), accelerated graphics port (AGP), etc. PCIe is a common motherboard interface for graphics cards, hard disk drive host adapters, solid state drives (SSDs), Wi-Fi® and Ethernet hardware connections.

Some top-of-rack (ToR) Ethernet switches are configured along with additional peripheral component interconnect express (PCIe) switches in the rack. Establishing network connectivity between the host servers, the TOR Ethernet switches, and the additional PCIe switches using Ethernet cabling requires complex conversions between a PCIe protocol and an Ethernet protocol. Moreover, conventional PCIe switches with a non-transparent bridge (NTB) at one or more ports, do not integrate network interface controller (NIC) and Ethernet switch functions in their hardware. Therefore, the provisioning of network virtual functions to virtual machines of each host server cannot be performed using conventional PCIe switches with an NTB at the port(s). Furthermore, some conventional PCIe switches do not provide Ethernet connectivity to the spine layer. Each host server in the rack requires on-board Ethernet NICs to provide connectivity to a ToR Ethernet switch in addition to PCIe cards that need to be installed therein. The ToR Ethernet switch provides Ethernet connectivity to the spine layer in the spine-leaf network architecture. There is a need to further reduce the hardware within the rack in the data centre by excluding the need for additional on-board devices, for example, on-board Ethernet NICs, in the host servers of the rack for establishing Ethernet connectivity to the spine layer.

Moreover, as disk capacity use has grown, disk failure creates a significant burden on an enterprise as data loss and management overheads of securing important data affects business performance and business opportunities. Redundant array of independent disks (RAID) technology prevents data loss and enhances business performance. RAID technology is a data storage virtualization technique for combining multiple physical disk drives into one or more logical units for data redundancy and/or performance improvement. RAID technology stores information across an array of relatively low-cost hard disk drives (HDDs), and hence RAID is also referred to as a redundant array of inexpensive disks. RAID combines multiple inexpensive HDDs into a single HDD. Conventional top-of-rack (ToR) switches in a data centre do not provide RAID features.

Furthermore, with the ever-increasing demands of new data-intensive applications, there is a need for disaggregation to scale-up by scaling-out, and composability, for dynamically assigning resources in a data centre to match changing workloads. Disaggregation refers to decoupling of closed hardware and software into completely open components that can be combined into a single device. Composability refers to a property through which a device, for example, a host server, can request and/or obtain resources, for example, compute, network, and storage resources, from a different portion of the network, for example, from another host server in the same rack or another rack in the data centre, to execute at least a portion of a workload. Composability also comprises the use of fluid pools of resources dynamically configured through software in any suitable configuration to run any application or a workload. Conventional networking typically involved inflexible, manual programming of multiple vendor-specific hardware devices. Moreover, conventional storage resources from an underlying hardware platform needed to be uncoupled and abstracted for greater flexibility, efficiency, and faster scalability, by making these storage resources programmable. By pairing programmability with resource flexibility, networking and storage can be enabled to rapidly and automatically adapt to new demands. A software-defined network communicates with underlying hardware infrastructure and directs traffic on a network using software-based components, for example, software-based controllers, application programming interfaces (APIs), etc. With software-defined storage, storage resources are abstracted from the underlying physical storage hardware and made flexible, which allows provisioning servers with storage.

Hence, there is a long-felt need for converging the functionalities of a network switch, a network interface controller, a software-defined network, a storage virtualisation controller, software-defined storage, RAID features, and a composable infrastructure on a single appliance.

SUMMARY OF THE INVENTION

This summary is provided to introduce a selection of concepts in a simplified form that are further disclosed in the detailed description of the invention. This summary is not intended to determine the scope of the claimed subject matter.

The present invention addresses the above-recited need for converging the functionalities of a network switch, a network interface controller, a software-defined network, a storage virtualisation controller, software-defined storage, redundant array of independent disks (RAID) features, and a composable infrastructure on a single appliance. In an embodiment, the present invention is configured to replace a conventional ToR Ethernet switch from a rack of a data centre. The single appliance with the converged functionalities is hereinafter referred to as a composable infrastructure module (CIM). Convergence provides an integrated and efficient means of managing infrastructure components on the single CIM. To meet the ever-increasing demands of new data-intensive applications, the present invention implements disaggregation to scale-up by scaling-out, and composability, for dynamically assigning resources in a data centre to match changing workloads. The CIM comprises separate components engineered to operate together. In an embodiment, the CIM uses peripheral component interconnect express (PCIe) features of virtual functions, single-root input/output virtualization (SR-IOV), and non-transparent bridging (NTB) to build a solution that interconnects more than one PCIe endpoint and more than one PCIe address domain with intelligent fabric. The CIM pools internal devices comprising, for example, network interface functions (NIFs), network switching function resources, storage virtualisation resources, etc., and external resources comprising, for example, central processing units (CPUs), co-processors, graphics processing units (GPUs), network controllers, and storage devices, and makes physical and virtual functions of such devices available as direct attached devices to connected nodes contained in the rack.

The disaggregated compute, network, and storage resources disclosed herein comprise multiple built-in resources of the composable infrastructure module (CIM) and multiple external resources published by multiple nodes, for example, host servers, contained in the rack of the data centre. The built-in internal resources comprise, for example, one or more of network interface functions (NIFs). The external resources comprise, for example, CPUs, GPUs, co-processors, field programmable gate arrays (FPGAs), storage devices, etc., of the nodes contained in the rack. In an embodiment, the external resources further comprise network controllers configured to share network resources with other nodes. The network resources in the disaggregated compute, network, and storage resources disclosed herein comprise Ethernet network resources. In an embodiment, one or more of the built-in internal resources and one or more of the external resources are configured to support single-root input/output virtualization (SR-IOV) and multiple virtual functions. Each of the nodes is deployed free of an Ethernet host bus adapter card and is configured to execute data communication with the CIM free of conversion between a peripheral component interconnect express (PCIe) protocol and an Ethernet protocol. The nodes in the rack are configured to communicate with the CIM disposed on top of the rack through PCIe links. In an embodiment, the CIM is configured as a top-of-rack (ToR) switch. In another embodiment, the CIM is configured as a middle-of-row (MoR) switch. In another embodiment, the CIM is configured as an end-of-row (EoR) switch.

The composable infrastructure module (CIM) is implemented with software that enables a composable infrastructure where a compute element, for example, a host server in a node of the rack, is connected to storage, for example, at least one disk drive, or to a network interface function resource which provides an Ethernet interface, or to another built-in internal resource or pooled external resource of the CIM over a communications mechanism. The composability feature of the CIM allows the CIM to connect disaggregated compute, network, and storage resources into pools of resources that are provisioned through a software application and network fabric and then deployed into server nodes. The CIM treats physical servers, network storage, GPUs, FPGAs, network switches, etc., as services that are logically pooled into resources that can be dynamically provisioned to multiple nodes, for example, host servers, contained in the rack as needed. The CIM also makes these resources available on-the-fly, depending on the needs of different physical, virtual, and containerized applications. The software-defined networking ability of the CIM provides visibility into the entire network and allows configuration of network services and allocation of virtual resources to change network infrastructure in real time through one centralized location. Furthermore, the software-defined networking ability of the CIM decouples network control and forwarding functions enabling the network control to become directly programmable and the underlying infrastructure to be abstracted for applications and network services. The software-defined storage ability of the CIM allows automated provisioning and reassignment of storage capacity. The RAID feature of the CIM combines multiple physical disk drives into one or more logical units for data redundancy and/or performance improvement.

The composable infrastructure module (CIM) disclosed herein comprises at least one processor, a memory unit operably and communicatively coupled to the processor(s) and configured to store computer program instructions executable by the processor(s), multiple non-transparent bridge (NTB) devices, an Ethernet switch function, multiple built-in internal resources, and a compose application. The processor(s) is, for example, a multicore central processing unit (CPU). The Ethernet switch function is executable by the processor(s) and is configured to provide Ethernet connectivity to a spine switch in the data centre through one or more Ethernet interfaces. In an embodiment, the CIM further comprises a network operating system configured to operate the Ethernet switch function to its fullest potential.

In an embodiment, non-transparent bridge (NTB) devices are, for example, mezzanine silicon chips deployed on a motherboard of the composable infrastructure module (CIM) and not plugged in as an adapter, for example, a host bus adapter (HBA). Each of the NTB devices is configured to establish peripheral component interconnect express (PCIe) connectivity between the processor(s) and the connected nodes and between the connected nodes, and to transfer data therebetween. In an embodiment, each of the NTB devices is configured to execute a bridging function for establishing inter-domain communication between the CIM and the nodes. Each NTB device is further designed and implemented to electrically and logically isolate the nodes from each other, while allowing status and data exchange between the nodes and between the CIM and the nodes. The NTB devices are used for connecting multiple PCIe address domains, herein represented by different nodes, for example, different hosts with PCIe subsystems. The NTB device used to connect two hosts or two PCIe address domains translates an address from one PCIe address domain to another. The process of translating addresses between PCIe address domains is performed within the hardware of each of the NTB devices. The nodes are, therefore, connected to the CIM via the NTB devices of the CIM, instead of using built-in network controllers of the nodes, which are conventionally used to connect the nodes to a ToR switch.

The built-in internal resources are operably connected to the processor(s). The built-in internal resources and multiple external resources published by the connected nodes constitute a pool of the disaggregated compute, network, and storage resources. The compose application defines computer program instructions executable by the processor(s) for selectively pooling and extending availability of the disaggregated compute, network, and storage resources as direct attached devices on demand as follows. The compose application configures the built-in internal resources for virtual functions. The compose application creates a pool of built-in internal resources operably connected to a PCIe root complex device of the processor(s). The compose application creates a pool of external resources published by the connected nodes through the non-transparent bridge (NTB) devices. In an embodiment, the compose application is configured as a private cloud management application configured to maintain the created pool of built-in internal resources and the created pool of external resources. Based on user input received via a user interface rendered by the compose application, the compose application selectively provisions functions, for example, physical and/or virtual functions of any one or more devices from the created pool of built-in internal resources and the created pool of external resources as direct attached devices to virtual machines (VMs) hosted on one or more of the connected nodes. The compose application selectively configures one or more of the NTB devices to attach one or more of the disaggregated compute, network, and storage resources to one or more of the connected nodes as direct attached devices based on the user input. In an embodiment, the composable infrastructure module (CIM) comprises network interface functions (NIFs) configured as part of the built-in internal resources. The compose application selectively provisions the NIFs to virtual machines of one or more of the connected nodes as direct attached network devices.

The composable infrastructure module (CIM) further comprises a volume manager module configured to define computer program instructions executable by the processor(s) for creating redundant array of independent disks (RAID) volumes by utilizing disaggregated storage resources, for example, from connected nodes, servers, etc. The compose application then selectively provisions the created RAID volumes to one or more of the connected nodes as direct attached disks based on the user input. In an embodiment, the volume manager module selectively provisions the created RAID volumes to one or more of the connected nodes as direct attached disks based on the user input directly. In an embodiment, the CIM further comprises a software-defined networking module configured to define computer program instructions executable by the processor(s) for configuring and operating the Ethernet switch function.

Disclosed herein is also a method for selectively provisioning physical and/or virtual functions of disaggregated compute, network, and storage resources or devices as direct attached devices to multiple nodes in a data centre. In the method disclosed herein, the composable infrastructure module (CIM) disclosed above is disposed at a predetermined position in a rack, for example, at the top of the rack. The nodes in the rack are connected to the non-transparent bridge (NTB) devices of the CIM via peripheral component interconnect express (PCIe) links. The compose application configures the built-in internal resources for virtual functions; creates a pool of built-in internal resources; and creates a pool of external resources published by the connected nodes through the NTB devices as disclosed above. The volume manager module creates redundant array of independent disks (RAID) volumes by utilizing storage resources from the created pool of external resources. Based on user input received via the user interface rendered by the compose application, the compose application selectively provisions the physical and/or virtual functions of any one or more devices from the created pool of internal resources, the created pool of external resources, and the created RAID volumes as direct attached devices to virtual machines hosted on one or more of the connected nodes. The compose application also selectively provisions network interface functions to the virtual machines of one or more of the connected nodes as direct attached network devices.

In one or more embodiments, related systems comprise circuitry and/or programming for effecting the present invention. In an embodiment, the circuitry and/or programming are of any combination of hardware, software, and/or firmware configured to implement the present invention depending upon the design choices of a system designer. Also, in an embodiment, various structural elements are employed depending on the design choices of the system designer.

BRIEF DESCRIPTION OF THE DRAWINGS

The foregoing summary, as well as the following detailed description of the invention, is better understood when read in conjunction with the appended drawings. For illustrating the present invention, exemplary constructions of the present invention are shown in the drawings. However, the present invention is not limited to the specific components, structures, and methods disclosed herein. The description of a component, or a structure, or a method step referenced by a numeral in a drawing is applicable to the description of that component, or structure, or method step shown by that same numeral in any subsequent drawing herein.

DETAILED DESCRIPTION OF THE INVENTION

Various aspects of the present disclosure are embodied as a system, a method, or a non-transitory, computer-readable storage medium having one or more computer-readable program codes stored thereon. Accordingly, various embodiments of the present disclosure herein take the form of an entirely hardware embodiment, an entirely software embodiment comprising, for example, microcode, firmware, software, etc., or an embodiment combining software and hardware aspects that are referred to herein as a "system", a "module", a "circuit", or a "unit".

Figure 1:
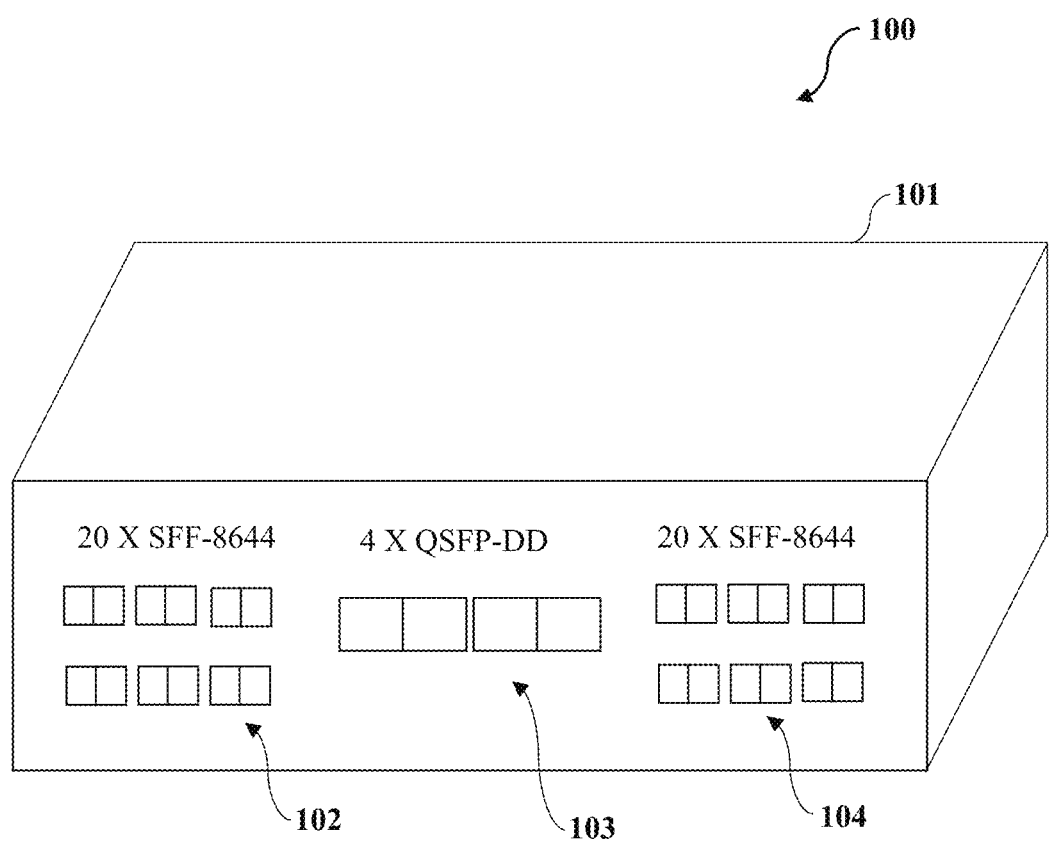
FIG. 1 illustrates an embodiment of a composable infrastructure module with converged functionalities of a network switch, a network interface controller, a software-defined network, a storage virtualisation controller, software-defined storage, redundant array of independent disks (RAID) features, and a composable infrastructure thereon.

FIG. 1 illustrates an embodiment of a composable infrastructure module (CIM) 100 with converged functionalities of a network switch, a network interface controller, a software-defined network, a storage virtualisation controller, software-defined storage, redundant array of independent disks (RAID) features, and a composable infrastructure thereon. In an embodiment, the CIM 100 with the converged functionalities is configured as a single appliance to replace a conventional top-of-rack (ToR) Ethernet switch from a rack of a data centre. The CIM 100 is a composable network appliance configured as a hardware module or a software module that creates pools of disaggregated compute, network, and storage resources in a data centre network, and makes the disaggregated compute, network, and storage resources available as services to nodes or servers of a data centre on demand. The CIM 100 is a rack mountable device. In an embodiment, the CIM 100 is built into a one rack unit (1U)-sized chassis 101. One rack unit is, for example, about 44.45 millimetres (mm) of rack height. The width of the chassis 101 of the CIM 100 is, for example, about 19 inches; the height of the chassis 101 of the CIM 100 is, for example, about 1.75 inches; and the width of the chassis 101 of the CIM 100 is, for example, about 17.7 inches, about 19.7 inches, or about 21.5 inches.

The chassis 101 of the composable infrastructure module (CIM) 100 houses, for example, about two printed circuit boards (PCBs) comprising one central processing unit (CPU) board and one fabric board. In an exemplary implementation, the CPU board comprises a multicore CPU, for example, a 32 core CPU with 128 peripheral component interconnect express (PCIe) lanes. The PCIe lanes provide a physical link between a PCIe-enabled device, for example, a non-transparent bridge (NTB) device of the CIM 100, and the CPU. Each PCIe lane comprises two pairs of wires, for example, copper wires, referred to as traces, that run through the main board, connecting the PCIe-enabled device to the CPU. Each PCIe lane uses one pair of wires to send data and the other pair of wires to receive data allowing for the full bandwidth to be utilized in both directions simultaneously. The PCIe lanes allow bits of data to be transferred from the PCIe-enabled device connected on the main board to the CPU for processing. The PCIe lanes implement a wide bandwidth and faster transfer rate PCIe bus standard. For example, the PCIe lanes are PCIe 5.0 generation lanes with data transfers rates of about 32 gigatransfers per second (GT/s) to about 3.94 gigabytes per second (GB/s). The CIM 100 disclosed herein is configured to be implemented with any generation of the PCIe bus standard, for example, PCIe 4.0, PCIe 5.0, and any future generations of the PCIe bus standard.

Figure 2:
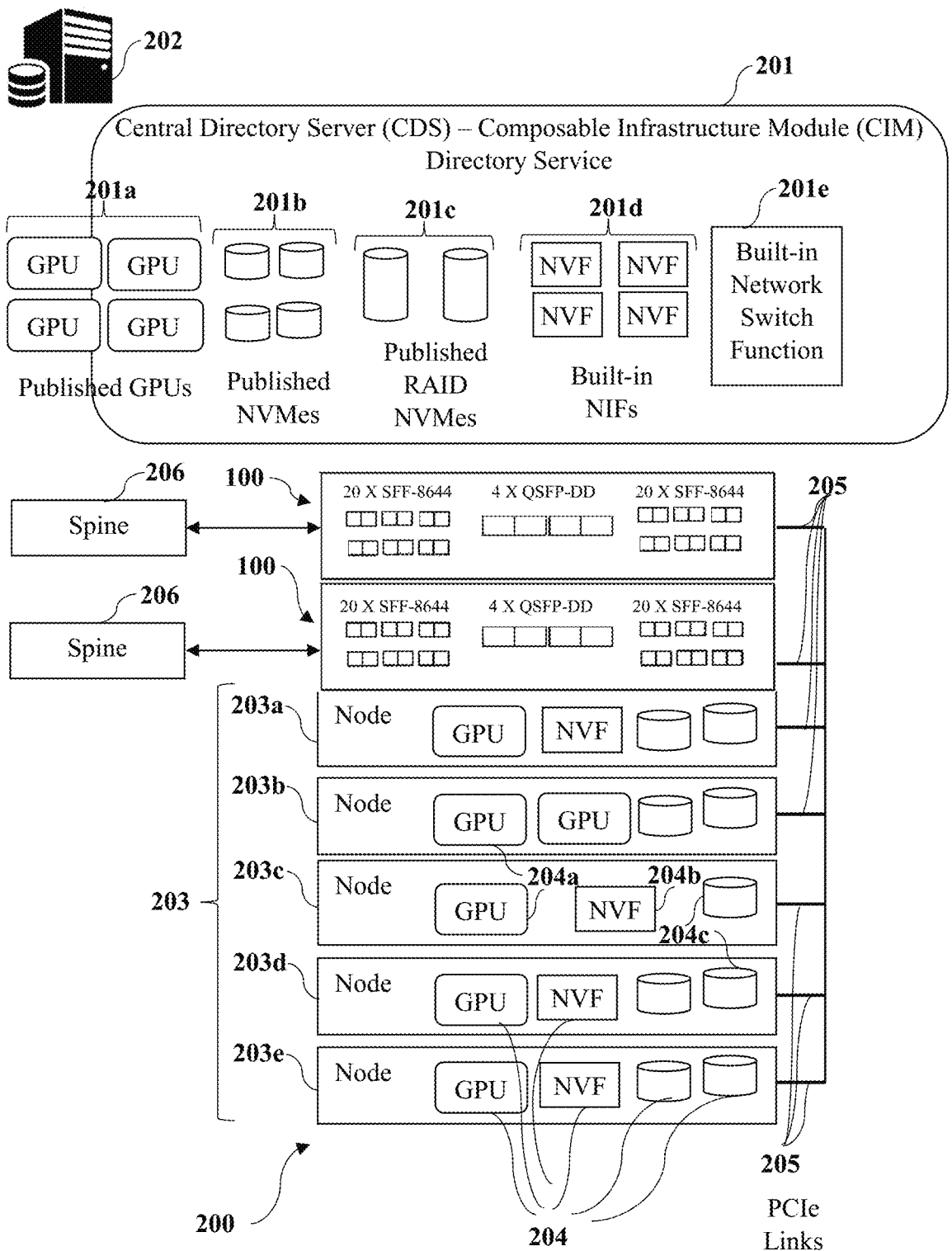
FIG. 2 illustrates a schematic of an exemplary implementation of the composable infrastructure module as a top-of-rack (ToR) switch disposed on top of a rack in a spine-leaf network architecture of a data centre.
Figure 3:
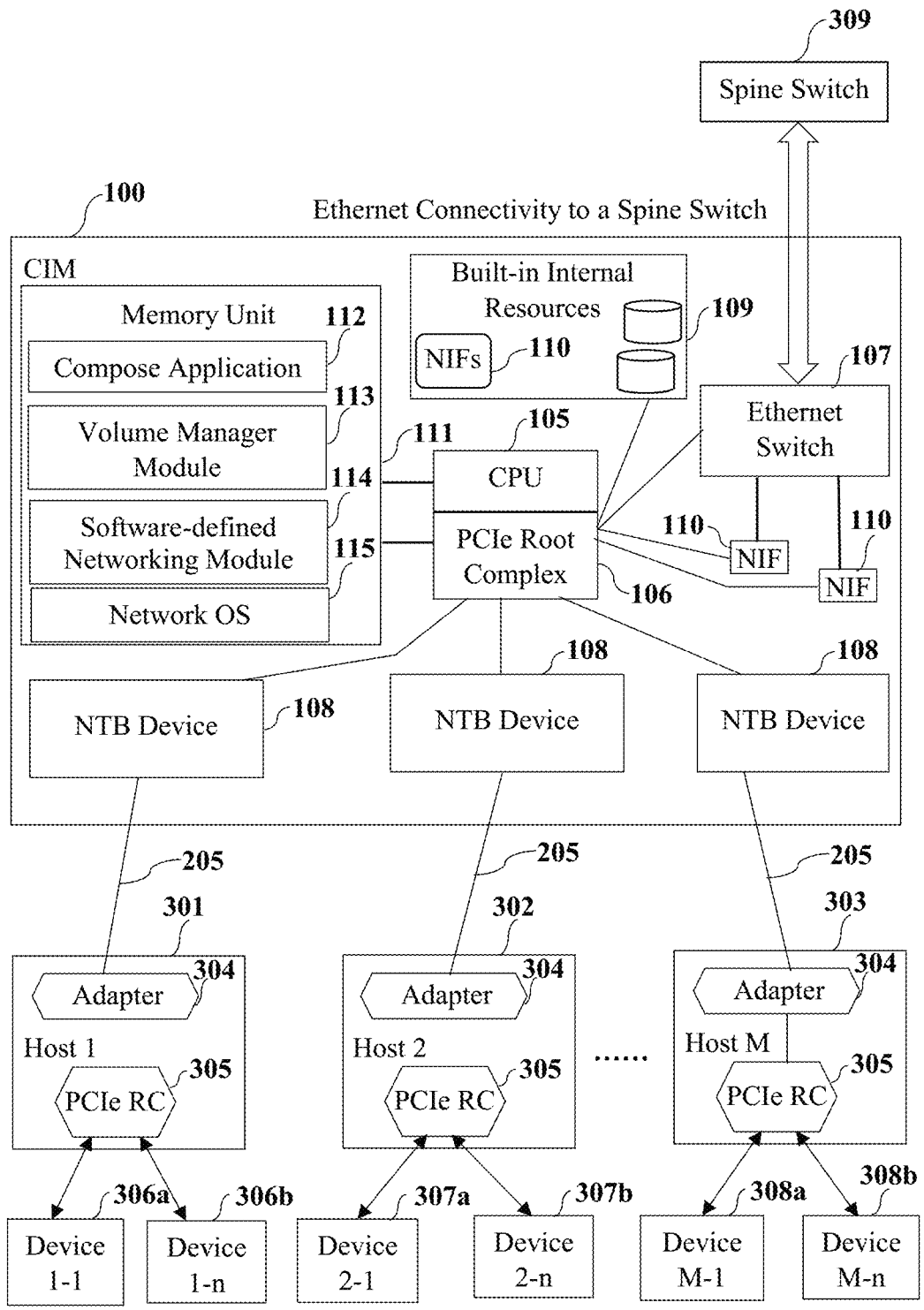
FIG. 3 illustrates a block diagram of an embodiment of the composable infrastructure module (CIM), showing multiple host servers connected to the CIM via peripheral component interconnect express (PCIe) links.

In an embodiment, the fabric board of the composable infrastructure module (CIM) 100 comprises multiple non-transparent bridge (NTB) devices, for example, PCIe Gen 5.0 NTB devices, with single-root input/output virtualization (SR-IOV)-supporting network interface functions (NIFs), and a built-in network switch function, for example, a built-in Ethernet switch function, as disclosed in the descriptions of FIG. 2 and FIG. 3. SR-IOV is an extension to the PCIe specification. SR-IOV is a specification that allows a supporting device, for example, a network interface controller (NIC), to separate access to its resources among various PCIe hardware functions in accordance with standards published by a PCIe consortium. That is, the SR-IOV functionality enables an SR-IOV function, for example, a single Ethernet port, to appear as multiple, separate, physical devices through virtual functions. In an exemplary implementation, the chassis 101 of the CIM 100 is configured to house upto 128 CPUs, 4096 network interface functions, and programmable Ethernet switch functions. In an embodiment, the chassis 101 of the CIM 100 is configured to house, for example, PCIe Gen 5.0 fabric switches and about 3000 to about 5000 network interface functions. In an embodiment, the CIM 100 comprises silicons, or chips, or application-specific integrated circuits (ASICs) that provide the functionalities of, for example, an Ethernet interface controller, a non-volatile memory express (NVMe) controller, an Ethernet switch, etc. In an embodiment, the silicons, chips, ASICs, etc., comprising the built-in devices of the CIM 100, for example, the NTB devices, the built-in internal resources such as the network interface functions, etc., are configured as mezzanine silicons on a motherboard of the CIM 100, as opposed to configuring the built-in devices on separate adapters or host bus adapters. The network interface functions appear as network interface controllers to nodes connected to the CIM 100. The CIM 100 provisions the network interface functions as physical devices to every virtual and physical machine that is connected to the CIM 100. The CIM 100 provisions the network interface functions as network interface controllers to virtual machines (VMs) and physical machines while hosting ethernet switch functionality within itself. A virtual machine is a compute resource that utilizes software instead of a physical computer to run computer programs and deploy applications.

A front end of the chassis 101 of the CIM 100 comprises PCIe ports 102 and 104 and Ethernet ports 103 as exemplarily illustrated in FIG. 1. In an exemplary implementation, the front end of the chassis 101 of the CIM 100 comprises upto forty eight (48) small form factor (SFF)-8644 connectors or pulse amplitude modulation 4-level (PAM4) connectors as the PCIe ports 102 and 104, and four (4) QSFP-DD Ethernet ports 103, where QSFP-DD refers to a quad small form factor pluggable double density transceiver. The QSFP-DD Ethernet ports 103 comprise transceiver modules configured for a 400 Gigabit (G) data rate. The PCIe ports 102 and 104 and the Ethernet ports 103 are physical ports or sockets into which cables, for example, PCIe cables, are plugged. Any one or more devices of the nodes contained in the rack can be connected to the PCIe ports 102 and 104 of the CIM 100 via PCIe links also referred to as PCIe cables. The PCIe links are packet-based serial bus links that provide high-speed, high-performance, point-to-point, dual simplex, input/output (I/O), differential signalling links for interconnecting devices, that is, for connecting devices of the nodes to the CIM 100. On plugging the PCIe links into the PCIe ports 102 and 104, the PCIe links get connected to corresponding switch silicons embedded on the fabric board or the motherboard of the CIM 100. In an embodiment, the PCIe ports 102 and 104 are internally connected to non-transparent bridge (NTB) ports of the NTB devices of the CIM 100, for example, by wires. The NTB devices are silicons or application-specific integrated circuits (ASICs) embedded on the fabric board of the CIM 100. The nodes are directly connected to the NTB ports through the PCIe links which are plugged into the PCIe ports 102 and 104. Through each NTB device, the NTB ports bridge the nodes to the CIM 100.

The composable infrastructure module (CIM) 100 is configured to pool disaggregated compute, network, and storage resources and make them available as direct attached devices on demand. The CIM 100 selectively provisions the disaggregated compute, network, and storage resources comprising multiple built-in internal resources of the CIM 100 and multiple external resources published by multiple nodes housed in the rack, to the nodes, as if the disaggregated compute, network, and storage resources are directly attached to the nodes. Although the disaggregated compute, network, and storage resources are logically provisioned on the nodes, the nodes assume the disaggregated compute, network, and storage resources are physically attached to them as the PCIe connectivity enables the nodes to share their devices, apart from allowing communication between the nodes. The CIM 100 implements convergence by integrating and managing multiple infrastructure components such as the disaggregated compute, network, and storage resources on a single appliance.

The composable infrastructure module (CIM) 100 is implemented with software that enables a composable infrastructure and decouples the disaggregated compute, network, and storage resources in order to treat them as services. The composability of the CIM 100 allows the CIM 100 to connect disaggregated compute, network, and storage resources comprising, for example, central processing units (CPUs), graphics processing units (GPUs), storage devices, etc., into pools of resources that are provisioned through a software application and network fabric and then deployed into server nodes. The composable infrastructure of the CIM 100 treats physical servers, network storage, GPUS, field programmable gate arrays (FPGAs), and network interface functions as services that are logically pooled into resources that can be dynamically provisioned by multiple nodes contained in the rack as needed. The composable infrastructure of the CIM 100 also makes these resources available on-the-fly depending on the needs of different physical, virtual, and containerized applications. The software-defined networking ability of the CIM 100 provides visibility into the entire network and allows configuration of network services and allocation of virtual resources to change network infrastructure in real time through one centralized location. Furthermore, the software-defined networking ability of the CIM 100 decouples network control and forwarding functions enabling the network control to become directly programmable and the underlying infrastructure to be abstracted for applications and network services. The software-defined storage ability of the CIM 100 allows automated provisioning and reassignment of storage capacity. The CIM 100 implements a software module, for example, a volume manager module, for provisioning nodes, for example, host servers, with storage. The redundant array of independent disks (RAID) features of the CIM 100 combine multiple physical disk drives into one or more logical units for data redundancy and/or performance improvement.

FIG. 2 illustrates a schematic of an exemplary implementation of the composable infrastructure module (CIM) 100 as a top-of-rack (ToR) switch disposed on top of a rack 200 in a spine-leaf network architecture of a data centre. The rack 200 is, for example, a 19-inch server rack, configured to house multiple nodes 203. The nodes 203 are, for example, rackmount servers such as host servers also referred to as node servers. Each of the nodes 203*a*, 203*b*, 203*c*. 203*d*, and 203*e* housed in the rack 200 is sized, for example, at 1 rack unit (1U). The height of a full rack 200 varies based on the manufacturer and is, for example, between 40U and 46U. In the exemplary implementation illustrated in FIG. 2, the rack 200 houses five nodes 203*a*, 203*b*, 203*c*, 203*d*, and 203*e* and two CIMs 100. Each CIM 100 comprises built-in internal resources, for example, one or more of network interface functions and an Ethernet switch function. The network interface functions and the Ethernet switch function are software implementations of a network interface controller (NIC) and an Ethernet switch, respectively, and accordingly, execute the functionalities of the NIC and the Ethernet switch, respectively. In an embodiment, the CIM 100 is configured as a top-of-rack (ToR) switch as illustrated in FIG. 2. ToR refers to a physical placement of a network switch at the top of the rack 200 for convenient accessibility and optimal cable management. In this embodiment, the CIM 100 is positioned on the top of the rack 200. For example, two CIMs 100 are positioned on the top of the rack 200 above the node 203*a* as illustrated in FIG. 2. The CIMs 100 replace a conventional TOR Ethernet switch typically positioned on the top of the rack 200. While ToR switches are mostly positioned on the top of the rack 200, in an embodiment, the ToR switches are configured to be positioned at any location in the rack 200, for example, the bottom of the rack 200, middle of the rack 200, etc. In another embodiment (not shown), the CIM 100 is configured as a middle-of-row (MoR) switch. In this embodiment, the CIM 100 is positioned in the middle of a row of multiple racks in the data centre, thereby eliminating the need for individual CIMs 100 in each rack 200. The nodes 203 of these racks are all connected to the CIM 100 positioned in the middle of the row of racks. In another embodiment (not shown), the CIM 100 is configured as an end-of-row (EoR) switch. In this embodiment, the CIM 100 is positioned at the end of a row of multiple racks in the data centre, thereby eliminating the need for individual CIMs 100 in each rack 200. The nodes 203 of these racks are all connected to the CIM 100 positioned at the end of the row of racks.

In an embodiment, the composable infrastructure module (CIM) 100 is configured to operate with a spine-leaf network architecture in the data centre. The CIMs 100 operate as leaf layers of the spine-leaf network architecture. The CIMs 100 aggregate traffic from the nodes 203 contained in the rack 200 and connect them to a spine layer 206 of the spine-leaf network architecture. The Ethernet connectivity from the nodes 203 to the CIM 100 is provided by the network interface functions provided by the CIM 100, thereby eliminating the need for Ethernet network interface controllers in the nodes 203 for connecting to the CIM 100 and reducing hardware requirements. Each of the CIMs 100 comprises a built-in network switch function, that is, an Ethernet switch function, for providing Ethernet connectivity to a spine switch of the spine layer 206 in the data centre through one or more Ethernet interfaces. The CIMs 100 connect to the spine layer 206 using, for example, about 400 Gigabit Ethernet (GbE). Gigabit Ethernet is an Ethernet transmission technology used for transmitting Ethernet frames at 400 Gigabit per second (Gbps).

The nodes 203 housed in the rack 200 are connected to the composable infrastructure modules (CIMs) 100 using peripheral component interconnect express (PCIe) links 205 as illustrated in FIG. 2. Each of the nodes 203 is deployed free of an Ethernet host bus adapter card and is configured to execute data communication with the CIMs 100 free of conversion between a PCIe protocol and an Ethernet protocol. The nodes 203 are configured to communicate with the CIMs 100 disposed on top of the rack 200 through the PCIe links 205. The nodes 203 connect to the CIMs 100 using external PCIe cables. Each of the nodes 203 comprises multiple resources, herein referred to as "external resources". The external resources comprise, for example, central processing units (CPUs), graphics processing units (GPUs), co-processors, field-programmable gate arrays (FPGAs), network controllers, storage devices, etc., of the nodes 203 enclosed in the rack 200. For example, the nodes 203*a*, 203*b*, 203*c*, 203*d*, and 203*e* comprise graphics processing units (GPUs) 204*a* and storage devices 204*c* as illustrated in FIG. 2. The network controllers in each of the nodes 203 allow sharing of network resources with other nodes 203. In an embodiment, the external resources further comprise redundant array of independent disks (RAID) storage devices assembled from storage pools created by the CIM 100. In an embodiment, each of the nodes 203*a*, 203*c*, 203*d*, and 203*e* comprises network virtual functions (NVFs) 204*b* provisioned thereon. The NVFs 204*b* are software implementations of network devices that are virtualized and run on virtual machines (VMs) of the nodes 203*a*, 203*c*. 203*d*, and 203*e*.

In the composable infrastructure implemented by the composable infrastructure module (CIM) 100, disaggregated compute, network, and storage resources are abstracted from their physical locations and are managed by software, herein referred to as a "compose application", for example, through a web-based interface or other user interface. In an embodiment, the composable infrastructure of the CIM 100 makes the disaggregated compute, network, and storage resources readily available as cloud services, while eliminating the need for workload-specific environments. The composable infrastructure of the CIM 100 provides a fluid set of resources that can be dynamically combined to meet the needs of any application, provides enhanced application performance, reduces underutilization and overprovisioning, and allows creation of an agile, cost-effective data centre. Furthermore, the composable infrastructure of the CIM 100 allows the disaggregated compute, network, and storage resources to be provisioned with code, thereby eliminating the need to physically configure hardware to meet the needs of new or updated applications.

In an embodiment, the composable application of the composable infrastructure module (CIM) 100 comprises a directory service called a CIM directory service (CDS) 201. The CIM directory service 201 builds and maintains a directory of available disaggregated compute, network, and storage resources throughout the network. The disaggregated compute, network, and storage resources disclosed herein comprise multiple built-in resources of the CIM 100 and multiple external resources published by the nodes 203 contained in the rack 200. The directory comprises mappings of unique identifiers, for example, names, of the available disaggregated compute, network, and storage resources throughout the network and their respective network addresses. As illustrated in FIG. 2, the directory shows mappings of the built-in network switch function 201e, that is, the Ethernet switch function, of the CIM 100; the built-in network interface functions (NIFs) with their configured network virtual functions (NVFs) 201d; published non-volatile memory express (NVMe) storage, for example, NVMe® storage devices or drives of NVM Express, Inc., that store RAID volumes 201c created by the CIM 100; and the graphics processing units (GPUs) 201a and the NVMe® storage 201b published by the nodes 203. The CIM 100 implements NVMe device functionality in software and provides NVMe devices to the nodes 203 connected to the CIM 100 over PCIe. The network virtual functions (NVFs) are PCIe functions that only process input/output (I/O). A virtual function of a PCIe end point appears as a physical device, for example, a network card, in the same way as a normal network card would appear to an operating system. The virtual functions of a PCIe end point/device are configured to be provisioned on the nodes 203a, 203c, 203d, and 203e. The compose application of the CIM 100 is configured to selectively provision the network interface functions 201d to virtual machines of one or more of the nodes 203a, 203c, 203d, and 203e as direct attached network devices.

Non-volatile memory express (NVMe) is a storage access and transport protocol for storage devices, for example, flash drives and next generation solid state drives (SSDs). The NVMe protocol delivers a substantially high throughput and fast response times for all types of workloads. The NVMe protocol accesses flash and SSD storage via the peripheral component interconnect express (PCIe) bus standard, which supports tens of thousands of parallel command queues. The nodes 203 issue directed searches for the disaggregated compute, network, and storage resources to a central directory server 202, when needed. The central directory server 202, in operable communication with the CIM 100, provides a shared information infrastructure for locating, managing, administering, and organizing the disaggregated compute, network, and storage resources.

FIG. 3 illustrates a block diagram of an embodiment of the composable infrastructure module (CIM) 100, showing multiple host servers 301, 302, 303, etc., connected to the CIM 100 via peripheral component interconnect express (PCIe) links 205. As illustrated in FIG. 3, the CIM 100 comprises at least one processor, for example, a central processing unit (CPU) 105, and a memory unit 111 operably and communicatively coupled to the processor(s). In an embodiment, the processor(s) refers to one or more CPU devices, microprocessors, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. In another embodiment, the processor is implemented as a processor set comprising, for example, a programmed microprocessor and a math or graphics co-processor. In an embodiment, the CIM 100 is not limited to employing a processor, and is configured to employ a controller or a microcontroller. In an exemplary implementation of the CIM 100, the processor(s) is a multicore CPU 105 with multiple PCIe lanes. The PCIe lanes provide connectivity to multiple nodes, for example, host servers 301, 302, 303, etc., illustrated in FIG. 3, in a data centre through multiple non-transparent bridge (NTB) devices 108 of the CIM 100 and adapters 304 of the nodes. The term "adapter" refers to a printed circuit board (PCB) with silicons, application-specific integrated circuits (ASICs), chips, etc., configured to provide one or more network or compute or storage functions, in each of the nodes.

The memory unit 111 is configured to store computer program instructions executable by the processor(s) herein referred to as the CPU 105. The memory unit 111 of the composable infrastructure module (CIM) 100 is a non-transitory, computer-readable storage medium that contains and stores computer programs and data, except for a transitory, propagating signal. The memory unit 111 records, stores, and reproduces data, program instructions, and applications. In an embodiment, the memory unit 111 comprises a random-access memory (RAM), for example, a double data rate 4 (DDR4) synchronous dynamic random-access memory, or another type of dynamic storage device that serves as a read and write internal memory and provides short-term or temporary storage for information and instructions executable by the CPU 105. The memory unit 111 also stores temporary variables and other intermediate information used during execution of the instructions by the CPU 105. In another embodiment, the memory unit 111 further comprises a read-only memory (ROM) or another type of static storage device that stores firmware, static information, and instructions for execution by the CPU 105. In an example, the memory unit 111 is the Intel® Optane® multi-layered, non-volatile memory of Intel Corporation.

In an embodiment, the CPU 105 is operably coupled to a PCIe root complex device 106 comprising multiple root ports. In an embodiment, the PCIe root complex device 106 operably couples the memory unit 111 to the CPU 105. In another embodiment, the memory unit 111 is directly connected to the CPU 105. In another embodiment, the memory unit 111 communicates with the CPU 105 via a data bus (not shown). The data bus transfers data to and from the memory unit 111 and into or out of the CPU 105. The PCIe root complex device 106 connects the CPU 105 and the memory unit 111 to the non-transparent bridge (NTB) devices 108 on the fabric board of the composable infrastructure module (CIM) 100. Each of the NTB devices 108 is a PCIe silicon, for example, a mezzanine silicon, implementing a non-transparent bridge functionality and providing two PCIe endpoint interfaces. As used herein, "PCIe silicon" refers to an application-specific integrated circuit (ASIC) chip capable of routing data traffic via PCIe links 205. The PCIe root complex device 106 initializes and manages the PCIe NTB fabric. The PCIe root complex device 106 also connects the CPU 105 to other built-in resources of the CIM 100, for example, the built-in internal resources 109 comprising network interface functions (NIFs) 110, the built-in NIFs 110, and the Ethernet switch function 107. The PCIe root complex device 106 generates transaction and configuration input/output (I/O) requests on behalf of the CPU 105. In an embodiment, the PCIe root complex device 106 comprises PCIe ports configured to connect to the built-in internal resources 109, the built-in NIFs 110, and the Ethernet switch function 107.

The built-in internal resources 109 are operably connected to the CPU 105 and in an embodiment, to the non-transparent bridge (NTB) devices 108. The PCIe root complex device 106 operably couples the built-in internal resources 109 to the CPU 105 and the NTB devices 108. The PCIe root complex device 106 also operably couples the Ethernet switch function 107 to the CPU 105. The Ethernet switch function 107 is a software implementation of a physical Ethernet switch with PCIe as a medium of Ethernet frame transfer from the nodes. The Ethernet switch function 107 is executable by the CPU 105 and is configured to provide Ethernet connectivity to a spine switch 309 in the data centre through one or more Ethernet interfaces. The Ethernet switch function 107 connects the composable infrastructure module (CIM) 100 to the spine switch 309 in the data centre through high-speed Ethernet interfaces. In an embodiment, the CIM 100 connects to the spine switch 309 or to an aggregation Ethernet switch of the data centre, through Ethernet cables. The Ethernet switch function 107 and associated data centre-proven network operating software are configured to provide the functionalities of a conventional Ethernet networking switch that is currently deployed at data centres. The CIM 100 is connected to the spine switch 309 in the data centre through high-speed Ethernet links provided by the Ethernet switch function 107.

In an embodiment, the composable infrastructure module (CIM) 100 further comprises a network operating system (OS) 115 configured to operate the Ethernet switch function 107 to its fullest potential. The network operating system 115 operates, for example, similar to the Junos® networking operating system software of Juniper Networks, Inc., the SONIC® networking operating system of Microsoft Corporation, etc. The network operating system 115 provides an internet protocol (IP) software suite comprising a collection of routing and switching protocol software. The routing and switching protocol software interacts with other switching and routing components in the network to build routing and switching tables. These routing and switching tables are programmed in the Ethernet switch function 107. The Ethernet switch function 107 utilizes these routing and switching tables to route packets through the Ethernet switch function 107. The network operating system 115 runs on the CPU 105 and configures and programs the Ethernet switch function 107. The built-in network interface functions (NIFs) 110 of the CIM 100 are operably connected to the CPU 105 and to the Ethernet switch function 107. The built-in NIFs 110 allow provisioning of their network interface functions to virtual machines hosted on the host servers 301, 302, 303, etc., in a rack of the data centre as direct attached physical network interface controllers (NICs). The PCIe root complex device 106 operably couples the NIFs 110 to the CPU 105. The NIFs 110 in the CIM 100 emulate the NICs as a software implementation of the NICs.

The PCIe root complex device 106 also operably couples multiple non-transparent bridge (NTB) devices 108 to the CPU 105. In an embodiment, the NTB devices 108 are connected to each other using PCIe cables. In another embodiment, the NTB devices 108 of the composable infrastructure module (CIM) 100 are connected to adapters 304 of multiple nodes, herein exemplarily referred to as host servers 301, 302, 303, etc., contained in the rack of the data centre, using PCIe cables also referred to as PCIe links 205. In an embodiment, each of the host servers 301, 302, 303, etc., comprises riser cards configured to connect the host servers 301, 302, 303, etc., to the NTB devices 108 of the CIM 100 using the PCIe links 205. A riser card is a printed circuit board that allows external expansion of a computer motherboard to a computer. The riser card allows connection of each of the host servers 301, 302, 303, etc., to the CIM 100. The NTB devices 108 are configured to connect the host servers 301, 302, 303, etc., to the CPU 105. The host CPU 105 in the CIM 100 is connected to upstream ports of the NTB devices 108 of the CIM 100. The host servers 301, 302, 303, etc., attach to the CIM 100 through downstream ports of the NTB devices 108. Each of the NTB devices 108 of the CIM 100 is configured to establish PCIe connectivity between the CPU 105 and the connected host servers 301, 302, 303, etc., and between the connected host servers 301, 302, 303, etc., and to transfer data therebetween.

The non-transparent bridge (NTB) devices 108 enable connectivity and data transfer across multiple PCIe address domains. The PCIe address domains represent the host servers 301, 302, 303, etc., with PCIe subsystems. Each PCIe address domain comprises a single memory address space, an input/output (I/O) address space, and an identifier (ID) address space. In an embodiment, each NTB device 108 is configured to execute a bridging function for establishing inter-domain communication between the composable infrastructure module (CIM) 100 and the host servers 301, 302, 303, etc. Each NTB device 108 bridges two PCIe address domains, thereby allowing inter-domain communication. Each NTB device 108 translates an address from one PCIe address domain to another. The process of translating addresses between PCIe address domains is performed within the hardware of each NTB device 108. In an embodiment, one of the connecting host servers 301, 302, 303, etc., comprises an NTB port to communicate between two of the host servers 301, 302, 303, etc., or two PCIe address domains. Each NTB device 108 forwards data packets across multiple PCIe address domains. Each NTB device 108 translates the memory address and device identifiers after each data packet is forwarded. Each NTB device 108 is further configured to electrically and logically isolate the host servers 301, 302, 303, etc., from each other, while allowing status and data exchange between the host servers 301, 302, 303, etc., and between the CIM 100 and the host servers 301, 302, 303, etc. The data transfer within the rack using the CIM 100 is performed using PCIe connectivity via the NTB devices 108, the adapters 304 or the riser cards, and the PCIe links 205. The NTB devices 108 of the CIM 100 connect to the adapters 304 of the host servers 301, 302, 303, etc., via PCIe links 205. These adapters 304 are placed in slots of the host servers 301, 302, 303, etc., and communicate with the CPU of each of the host servers 301, 302, 303, etc., through a connecting bus of each of the host servers 301, 302, 303, etc.

The non-transparent bridge (NTB) devices 108 of the composable infrastructure module (CIM) 100 provide the ability to provision virtual functions or devices as direct attached devices. Each NTB device 108 allows mapping of memory regions of remote PCIe devices to the CPU 105 and allows the CPU 105 to perform memory operations, for example, reading from or writing to registers, on the remote PCIe devices. Each NTB device 108 in the CIM 100 also allows a remote PCIe device to reverse-map a local memory of the CIM 100 for the remote PCIe device. Each NTB device 108 allows mapping of local resources of the CIM 100 for the remote PCIe device, thereby allowing the remote PCIe device to write message-signalled interrupts (MSIs) and access the local memory of the CIM 100 across the NTB device 108. This process enables insertion of virtual devices into a local device tree of the CIM 100, making it appear as if the virtual devices were hot-added in the CIM 100. The NTB devices 108 provide interfaces to create the memory mappings across the different host servers 301, 302, 303, etc. Once the desired memory mappings are created, the remote PCIe devices and virtual functions become direct attached devices to the local CPU 105 of the CIM 100. By programming the NTB devices 108, the required memory mappings of the PCIe devices from the host servers 301, 302, 303, etc., are memory mapped to other host servers and the CIM 100 and vice-versa.

Consider an example of sharing virtual or physical network interface functions 110 of the composable infrastructure module (CIM) 100 to the host servers 301, 302, 303, etc. Each non-transparent bridge (NTB) device 108 is programmed to map a memory address range corresponding to a virtual or physical network interface function 110 to a memory address range allocated in the CPU of a host server, for example, host server 1 301. When the host server 1 301 accesses this memory address range, the NTB device 108 that connects to the host server 1 301 translates the memory address range to a corresponding device address of the network interface function 110. In another example, to share a non-volatile memory express (NVMe) device of a host server 1 301 with a host server 2 302, the NTB devices 108 that are attached to the host server 1 301 and the host server 2 302 are programmed to memory map the addresses appropriately for the NVMe device to be provisioned as a direct attached device to the host server 2 302. The compose application 112 configures and programs the NTB devices 108 when a user or administrator executes a "Compose and Provision" request. The present invention, therefore, converges and operates multiple silicons inside the CIM 100 in tandem for creating an appearance of the silicons being physically present in the connected nodes rather than their actual physical presence in the CIM 100.

As illustrated in FIG. 3, each of the host servers 301, 302, 303, etc., comprises a PCIe root complex device 305 configured to couple endpoint devices, for example, PCIe endpoint (PEP) devices, to the host servers 301, 302, 303, etc. For example, the PCIe root complex device 305 couples the PEP devices, that is, Device 1-1 306a and Device 1-n 306b to the host server 301; Device 2-1 307a and Device 2-n 307b to the host server 302; and Device M-1 308a and Device M-n 308b to the host server 303. In an embodiment, a host CPU associated with the PCIe root complex device 305 allocates address space for each of the PEP devices, for example, 306a, 306b, etc., attached to the PCIe root complex 305 as part of a PCIe enumeration process. The host CPU is configured to access the PEP devices 306a, 306b, etc., using the address space allocated during the PCIe enumeration process. In an embodiment, the PEP devices 306a, 306b, 307a, 307b, 308a, and 308b constitute the external resources configured to be published by the host servers 301, 302, 303, etc., to the composable infrastructure module (CIM) 100. In an embodiment, the host servers 301, 302, 303, etc., publish their own PCIe devices, for example, graphics processing units (GPUs), storage devices, redundant array of independent disks (RAID) controllers, filed programmable gate arrays (FPGAs), co-processors, etc., to the CIM 100. In an embodiment, a driver software module (not shown) is configured to run on each of the host servers 301, 302, 303, etc. The driver software module publishes the resources provided by the host servers 301, 302, 303, etc., through the non-transparent bridge (NTB) devices 108 to the CIM 100. In an embodiment, an administrator of each of the host servers 301, 302, 303, etc., selects and maintains a list of resources that can be shared with other host servers. The driver software module publishes this list of resources when queried by the compose application 112 of the CIM 100 through the NTB devices 108. The compose application 112 that runs in the CIM 100 collates these resources and creates a pool as disclosed below.

The built-in internal resources 109 and 110 and the external resources, for example, the PCIe endpoint devices 306a, 306b, 307a, 307b, 308a, and 308b published by the connected host servers 301, 302, 303, etc., constitute disaggregated compute, network, and storage resources. In an embodiment, one or more of the built-in internal resources 109 and 110 and one or more of the external resources are configured to support single-root input/output virtualization (SR-IOV) and multiple virtual functions. For example, the built-in network interface functions (NIFs) 110 or any other internal resources built into the composable infrastructure module (CIM) 100 support SR-IOV functionality and support multiple virtual functions. The SR-IOV functionality allows a single PCIe physical device under a single root port to appear as multiple separate physical devices to a hypervisor or a guest operating system. A hypervisor, in the form of software, firmware, or hardware, for example, the VMware vSphere® hypervisor of VMWare, Inc., the Hyper-V® of Microsoft Corporation, The Xen Project® hypervisor of The Linux Foundation, etc., serves as a virtual machine monitor (VMM) and abstracts resources from hardware and creates virtual machines that run operating systems and applications. Virtualization technology utilizes software, for example, the hypervisor, to simulate virtual hardware that allows multiple virtual machines to run on a single machine, for example, a host server. In another example, the host servers 301, 302, 303, etc., in the rack also support the SR-IOV functionality for their published resources for sharing with other host servers.

In the data centre, for example, the host servers 301, 302, 303, etc., run a virtualized environment and execute respective hypervisors. Multiple virtual machines run on top of each hypervisor. The virtual machines are the actual applications that run on the host servers 301, 302, 303, etc. Each hypervisor comprises a virtual switch to handle external communications of the virtual machines and communications between applications on the virtual machines on a particular host server. The virtual machines connect to the virtual switch using virtual network interface controllers (NICs). Because it is a virtual switch, the processor of each host server performs packet header analysis, routing table lookups, etc., as software tasks.

Single-root input/output virtualization (SR-IOV) uses physical functions and virtual functions to manage global functions for the SR-IOV-enabled devices. Physical functions are full-featured PCIe functions that are capable of configuring and managing the SR-IOV functionality. Physical functions configure and control PCIe devices and move data in and out of the PCIe devices. Virtual functions are lightweight PCIe functions that support data flow and exchange with a restricted set of configuration resources. SR-IOV enhances the PCIe specification to allow virtual machines of the host servers 301, 302, 303, etc., to share the disaggregated compute, network, and storage resources. SR-IOV enables assignment of each of the virtual functions to the virtual machines sharing physical resources effectively, thereby obviating the need for separate physical resources for each of the virtual machines, which reduces hardware requirements and resultant costs of space and power required in the data centre. The ability to attach SR-IOV virtual functions as direct attached devices to the virtual machines across the PCIe address domains reduces the software overload and the CPU power required and thereby reduces the space and power requirements by hardware resources.

The compose application 112 of the composable infrastructure module (CIM) 100 is configured to define computer program instructions for selectively pooling and extending availability of the disaggregated compute, network, and storage resources as direct attached devices on demand. The memory unit 111 is configured to store the computer program instructions defined by the compose application 112. The CPU 105 is configured to execute the computer program instructions defined by the compose application 112. In an embodiment, the compose application 112 runs in the CIM 100 and maintains the pool of resources comprising, for example, PCIe endpoints, devices, resources published by the connected host servers 301, 302, 303, etc., and the built-in network interface functions (NIFs) 110. The compose application 112 configures the built-in internal resources 109 comprising the NIFs 110 for virtual functions. The compose application 112 creates a pool of built-in internal resources 109 and 110 operably connected to the PCIe root complex 106 of the CPU 105. The compose application 112 creates a pool of external resources, for example, 306a, 306b, 307a, 307b, 308a, and 308b, published by the connected host servers 301, 302, 303, etc., through the non-transparent bridge (NTB) devices 108 and the adapters 304. The compose application 112 pools the virtual functions provided by single-root input/output (I/O) virtualization (SR-IOV) devices from the built-in internal resources 109 and the NIFs 110, and the resources published by the host servers 301, 302, 303, etc. In an embodiment, each of these virtual functions is configured to be provisioned as direct attached devices to the virtual machines on the host servers 301, 302, 303, etc., by the compose application 112.

In an embodiment, the compose application 112 is configured as a private cloud management application configured to maintain the created pool of built-in internal resources 109 and 110 and the created pool of external resources, for example, 306a, 306b. 307a, 307b, 308a, and 308b. In this embodiment, the composable infrastructure module (CIM) 100 operates in a private cloud computing environment where all hardware and software resources are dedicated exclusively to and accessible only by a private internal network within a single entity, for example, a business entity, an organization, an enterprise, etc. The private cloud computing environment provides extended, virtualized computing resources via physical components stored on-premises or at the data centre of the single entity. The private cloud computing environment is hosted either at the data centre of the single entity, at a third party colocation facility, or via a private cloud provider that offers private cloud hosting services.

The compose application 112 provides a user interface, for example, a graphical user interface (GUI), a command line interface (CLI), etc., using which, an administrator or a user can provision any device from the pool of resources, for example, the built-in internal resources 109, the network interface functions (NIFs) 110, redundant array of independent disks (RAID) volumes of the composable infrastructure module (CIM) 100, etc., as direct attached devices to the connected host servers 301, 302, 303, etc., on the rack. That is, the user interface of the compose application 112 allows an administrator or a user to provision any device from the pool of resources as direct attached devices to virtual machines of the connected host servers 301, 302, 303, etc., on the rack. Based on user input received via the user interface rendered by the compose application 112, the compose application 112 selectively provisions physical and/or virtual functions of any one or more devices from the created pool of built-in internal resources 109 and 110 and the created pool of external resources, for example, 306a, 306b, 307a, 307b, 308a, and 308b, as direct attached devices to virtual machines hosted on one or more of the connected host servers 301, 302, 303, etc. The compose application 112 selectively configures one or more of the non-transparent bridge (NTB) devices 108 to attach one or more of the disaggregated compute, network, and storage resources to one or more of the connected host servers 301, 302, 303, etc., as direct attached devices based on the user input. In an embodiment, the built-in NIFs 110 of the CIM 100 are operably connected to the CPU 105 and to the Ethernet switch function 107. The NIFs 110 connect with the Ethernet switch function 107 on one side and with the CPU 105 on its other side. The NIFs 110 provide network virtual functions that can be provisioned as direct attached network devices to virtual machines on the host servers 301, 302, 303, etc. The compose application 112 selectively provisions the network virtual functions of the NIFs 110 to the virtual machines of one or more of the connected host servers 301, 302, 303, etc., as direct attached network devices.

Figure 6:
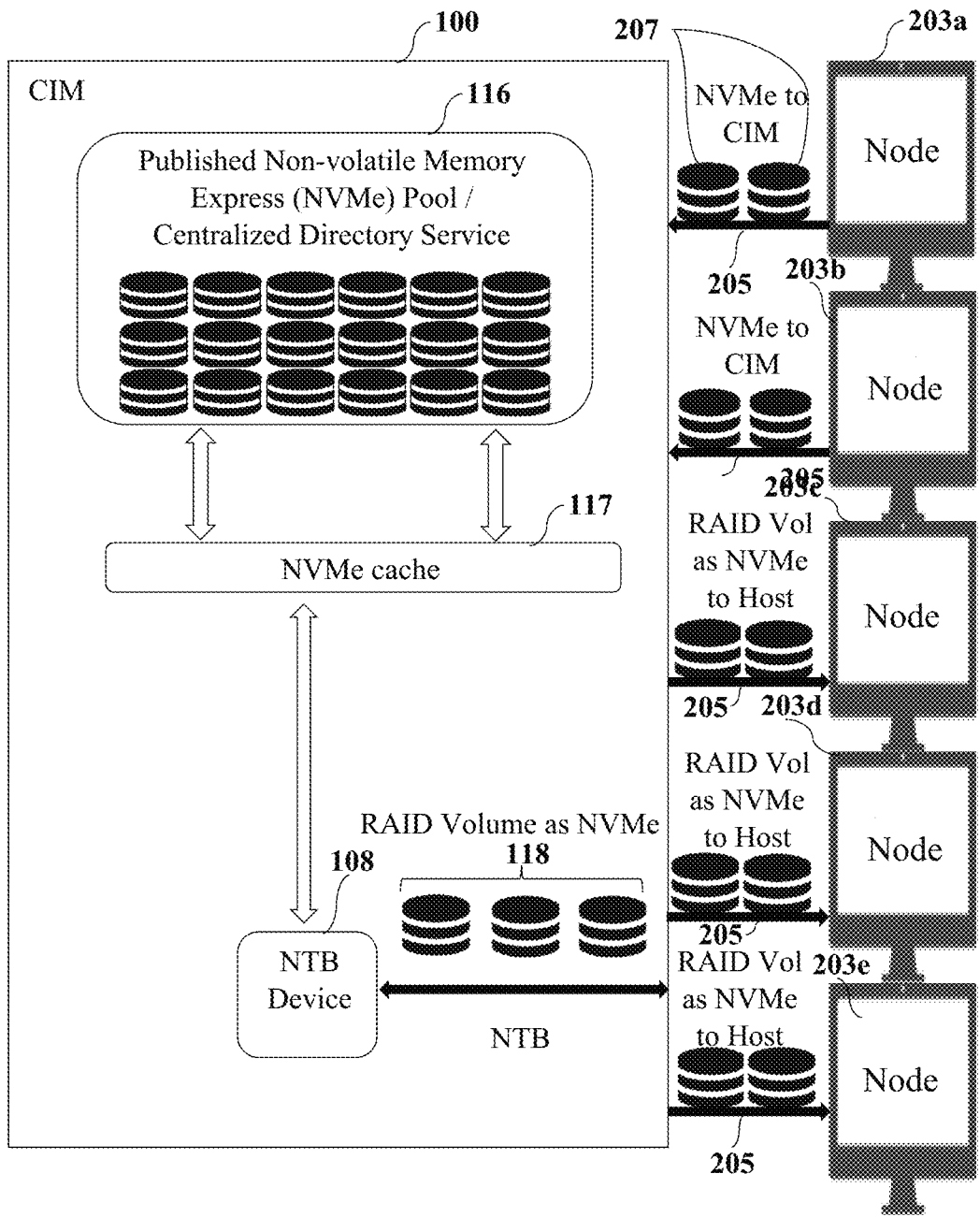
FIG. 6 illustrates an architectural block diagram of an embodiment of the composable infrastructure module configured for creating and provisioning RAID volumes to multiple nodes as direct attached disks.

The composable infrastructure module (CIM) 100 further comprises a volume manager module 113 configured to define computer program instructions for creating redundant array of independent disks (RAID) volumes by utilizing disaggregated storage resources as disclosed in the description of FIG. 6. The memory unit 111 is configured to store the computer program instructions defined by the volume manager module 113. The CPU 105 is configured to execute the computer program instructions defined by the volume manager module 113. The volume manager module 113, hosted on the CIM 100, runs on the CPU 105, and is configured to provide RAID volume services to the host servers 301, 302, 303, etc., contained in the rack. The compose application 112 selectively provisions the created RAID volumes to one or more of the connected host servers 301, 302, 303, etc., as direct attached disks based on user input as disclosed in the description of FIG. 6. In an example, the compose application 112 selectively provisions the created RAID volumes as non-volatile memory express (NVMe) devices to one or more of the connected host servers 301, 302, 303, etc., based on user input. In an embodiment, the volume manager module 113 itself selectively provisions the created RAID volumes to one or more of the connected host servers 301, 302, 303, etc., as direct attached disks based on user input.

In an embodiment, the composable infrastructure module (CIM) 100 further comprises a software-defined networking module 114 configured to define computer program instructions for configuring and operating the Ethernet switch function 107. The memory unit 111 is configured to store the computer program instructions defined by the software-defined networking module 114. The CPU 105 is configured to execute the computer program instructions defined by the software-defined networking module 114. The software-defined networking module 114 operates on network interfaces for the Ethernet Switch function 107 within the CIM 100.

The software-defined networking module 114 implements software-defined networking (SDN) which is an approach to networking that uses software-based controllers or application programming interfaces (APIs) to communicate with underlying hardware infrastructure and direct traffic on a network. SDN differs from conventional networks, which use dedicated hardware devices, for example, routers and switches, to control network traffic. SDN creates and controls a virtual network or controls conventional hardware via software. While network virtualization allows organizations to segment different virtual networks within a single physical network, or to connect devices on different physical networks to create a single virtual network, SDN provides a method for controlling the routing of data packets from a centralized server.

The compose application 112, the volume manager module 113, and the software-defined networking module 114 of the composable infrastructure module (CIM) 100, when loaded into the memory unit 111 and executed by the CPU 105, transform the CIM 100 into a specially-programmed, special purpose computing device configured to implement the converged functionalities disclosed herein. The CPU 105 retrieves instructions defined by the compose application 112, the volume manager module 113, and the software-defined networking module 114 from the memory unit 111 for executing the respective functions disclosed above. In an embodiment, computer program codes comprising computer readable and executable instructions of the compose application 112, the volume manager module 113, and the software-defined networking module 114 are implemented in any programming language, for example, C, C++, C#, Java®, JavaScript®, Ruby, Perl® Python®, hypertext preprocessor (PHP), etc. In another embodiment, other object-oriented, functional, scripting, and/or logical programming languages are also used. In an embodiment, the computer program codes or software programs are stored on or in one or more mediums as object code.

The composable infrastructure module (CIM) 100 provides composability of a cloud infrastructure as follows. The PCIe connectivity provided between the host servers 301, 302, 303, etc., and the CIM 100 through the non-transparent bridge (NTB) devices 108 and the adapters 304 obviate the need for separate network interface controller (NIC) cards for each of the host servers 301, 302, 303, etc. Moreover, the PCIe links 205 used to connect the CIM 100 to the host servers 301, 302, 303, etc., replace the conventional Ethernet connectivity provided by Ethernet cables between a conventional top-of-rack (ToR) switch and the host servers of a conventional rack, thereby obviating the need for installing Ethernet host bus adapter cards in the host servers 301, 302, 303, etc. The PCIe links 205 provide a wider bandwidth PCIe connectivity between the CIM 100 to the host servers 301, 302, 303, etc., through the NTB devices 108 and the adapters 304. All the communications between the host servers 301, 302, 303, etc., comprising compute, GPU, and storage resources within the same rack are performed through the PCIe links 205. Furthermore, the ability of the CIM 100 to provide network connectivity to the virtual machines in the host servers 301, 302, 303, etc., through the provisioned network virtual functions of the built-in NIFs 110, obviates the need for Ethernet host bus adapter cards in the host servers 301, 302, 303, etc. Furthermore, the resources published by the host servers 301, 302, 303, etc., can also be provisioned as direct attached devices to other host servers connected to the PCIe ports by the CIM 100. The CIM 100 combines the composability of infrastructure and top-of-rack (ToR) switch features. The composability feature enables the CIM 100 to pool disaggregated compute, network, and storage resources and make them available as direct attached devices on demand.

Figure 4:
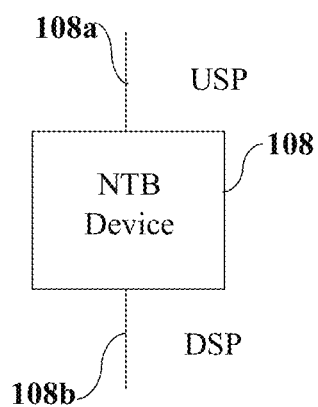
FIG. 4 illustrates a block diagram of an embodiment of a non-transparent bridge device embedded in the composable infrastructure module.

FIG. 4 illustrates a block diagram of an embodiment of a non-transparent bridge (NTB) device 108 embedded in the composable infrastructure module (CIM) 100 shown in FIG. 3. In an exemplary implementation of the CIM 100, each NTB device 108 of the CIM 100 comprises two NTB ports, namely, an upstream port (USP) 108a and a downstream port (DSP) 108b as illustrated in FIG. 4. The NTB device 108 executes a bridging function for establishing inter-domain communication between the CIM 100 and multiple nodes contained in a rack of a data centre. The NTB device 108 also electrically and logically isolates the nodes from each other, while allowing status and data exchange between the nodes and between the CIM 100 and the nodes. The nodes are directly connected to the downstream ports 108b of the NTB devices 108 through external connectors, that is, the PCIe links 205, that are plugged into the PCIe ports of the CIM 100, which are connected, for example, by wires, into the downstream ports 108b inside the NTB devices 108. The NTB devices 108 receive PCIe signals from the connected nodes via the downstream ports 108b of the NTB devices 108. Each NTB device 108 is internally connected to the PCIe root complex device 106 of the CIM 100 via the respective upstream port 108a, as illustrated in FIG. 3.

Figure 5:
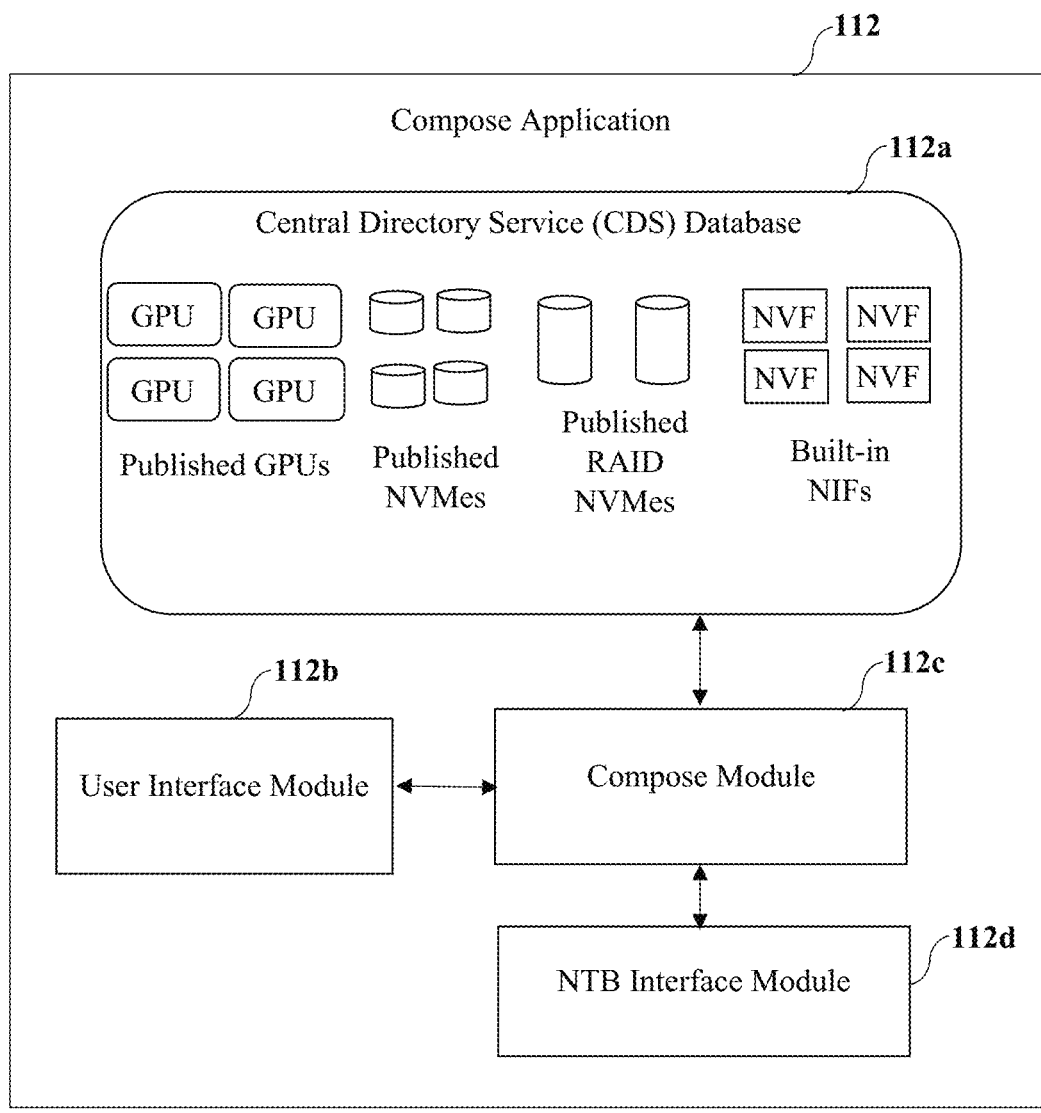
FIG. 5 illustrates a block diagram of an embodiment of a compose application deployed in the composable infrastructure module.

FIG. 5 illustrates a block diagram of an embodiment of a compose application 112 deployed in the composable infrastructure module (CIM) 100 shown in FIG. 3. In this embodiment, the compose application 112 comprises a central directory service (CDS) database 112a, a user interface module 112b, a compose module 112c, and a non-transparent bridge (NTB) interface module 112d. The CDS database 112a stores and holds resource pool information comprising, for example, information of the built-in resources of the CIM 100 and the resources published by nodes, for example, host servers, connected to the CIM 100. The user interface module 112b renders a user interface, for example, a command line interface, a graphical user interface (GUI), etc., on a user device to allow a user to obtain a list of all resources available and their status, for example, provisioned, not provisioned, etc., and provision or de-provision resources to one or more virtual machines of the connected nodes. The compose module 112c lists the resource pool comprising, for example, non-volatile memory express (NVMe) virtual functions, network virtual functions (NVFs), virtual graphics processing units (GPUs), etc. The compose module 112c also provisions and de-provisions resources from the resource pool comprising, for example, NVMe virtual functions, NVFs, virtual GPUs, etc., to the virtual machine(s). The compose module 112c interfaces with the CDS database 112a to retrieve the list of resources available from the built-in resources within the CIM 100 and the resources published by the nodes connected to the CIM 100. The compose module 112c also interfaces with the NTB interface module 112d to configure the PCIe ports and in turn, the NTB ports of the CIM 100. The NTB interface module 112d allows programming of each NTB device of the CIM 100 to enable direct attachment and provisioning of the resources to the virtual machines by configuring the NTB devices appropriately.

FIG. 6 illustrates an architectural block diagram of an embodiment of the composable infrastructure module (CIM) 100 configured for creating and provisioning redundant array of independent disks (RAID) volumes to multiple nodes, for example, 203c. 203d, and 203e as direct attached disks. FIG. 6 shows how different components interwork in RAID volume services provided by the CIM 100. The CIM 100 provides flexible, on demand, RAID volume services to nodes 203a, 203b, 203c. 203d, and 203e, for example, servers, contained in a rack of a data centre, through the volume manager module 113 running in the multicore central processing unit (CPU) 105 of the CIM 100 illustrated in FIG. 3. The compose application 112 maintains a pool of storage resources, for example, a non-volatile memory express (NVMe) pool 116, in the CIM 100. The volume manager module 113 creates RAID volumes by utilizing the NVMe pool 116 and enables the compose application 112 to provision the RAID volumes as NVMe storage to the nodes 203c. 203d, and 203e. In an embodiment, the volume manager module 113 directly provisions the RAID volumes as NVMe storage to the nodes 203c, 203d, and 203e as disclosed below.

The RAID volumes comprise, for example, a RAID 0 volume, a RAID 1 volume, a RAID 3 volume, a RAID 5 volume, and a RAID 10 volume. RAID 0 implements block striping, where data is broken into logical blocks and striped across multiple drives. RAID 0 does not provide a facility for redundancy and hence data is lost in the event of a disk failure. RAID 1 implements disk mirroring, where a copy of the same data is recorded onto two drives for protecting data against a disk failure. RAID 3 implements block striping with dedicated parity. RAID 3 breaks data into logical blocks and then strips these blocks across multiple drives. RAID 5 implements multiple-block striping with distributed parity. RAID 5 offers redundancy with the parity information distributed across all disks in the array. RAID 10 or RAID 1+0 combines RAID 0 and RAID 1 to offer mirroring and disk striping.

The nodes 203a, 203b, 203c, 203d, and 203e are connected to the composable infrastructure module (CIM) 100 via peripheral component interconnect express (PCIe) links 205. The nodes, for example, 203a and 203b, publish non-volatile memory express (NVMe) virtual functions to the CIM 100 as illustrated in FIG. 6. The compose application 112 adds the NVMe virtual functions 207 published by the nodes 203a and 203b to the NVMe pool 116 maintained, for example, as a centralized directory service. In an embodiment, the volume manager module 113 comprises a memory, for example, an NVMe cache 117, that serves as a read and write internal memory and provides short-term or temporary storage for information and instructions defined by the volume manager module 113.

The volume manager module 113 composes RAID volumes 118 as NVMe devices based on user requirements and user input received via the user interface rendered by the compose application 112. The volume manager module 113 utilizes the published NVMe pool 116 through the NVMe cache 117 to create the RAID volumes 118. In another embodiment, the compose application 112 adds the RAID volumes 118 to the centralized directory service. The volume manager module 113 attaches the composed RAID volumes 118 as NVMe storage to the nodes, for example, 203c, 203d, and 203e, as illustrated in FIG. 6. The volume manager module 113 communicates with the nodes, for example, 203c. 203d, and 203e, via the non-transparent bridge (NTB) device 108 of the composable infrastructure module (CIM) 100. The NTB device 108 executes a bridging function for establishing inter-domain communication between the CIM 100 and the nodes 203c. 203d, and 203e and attaching the RAID volumes 118 as NVMe storage to the nodes 203c, 203d, and 203e.

Figure 7:
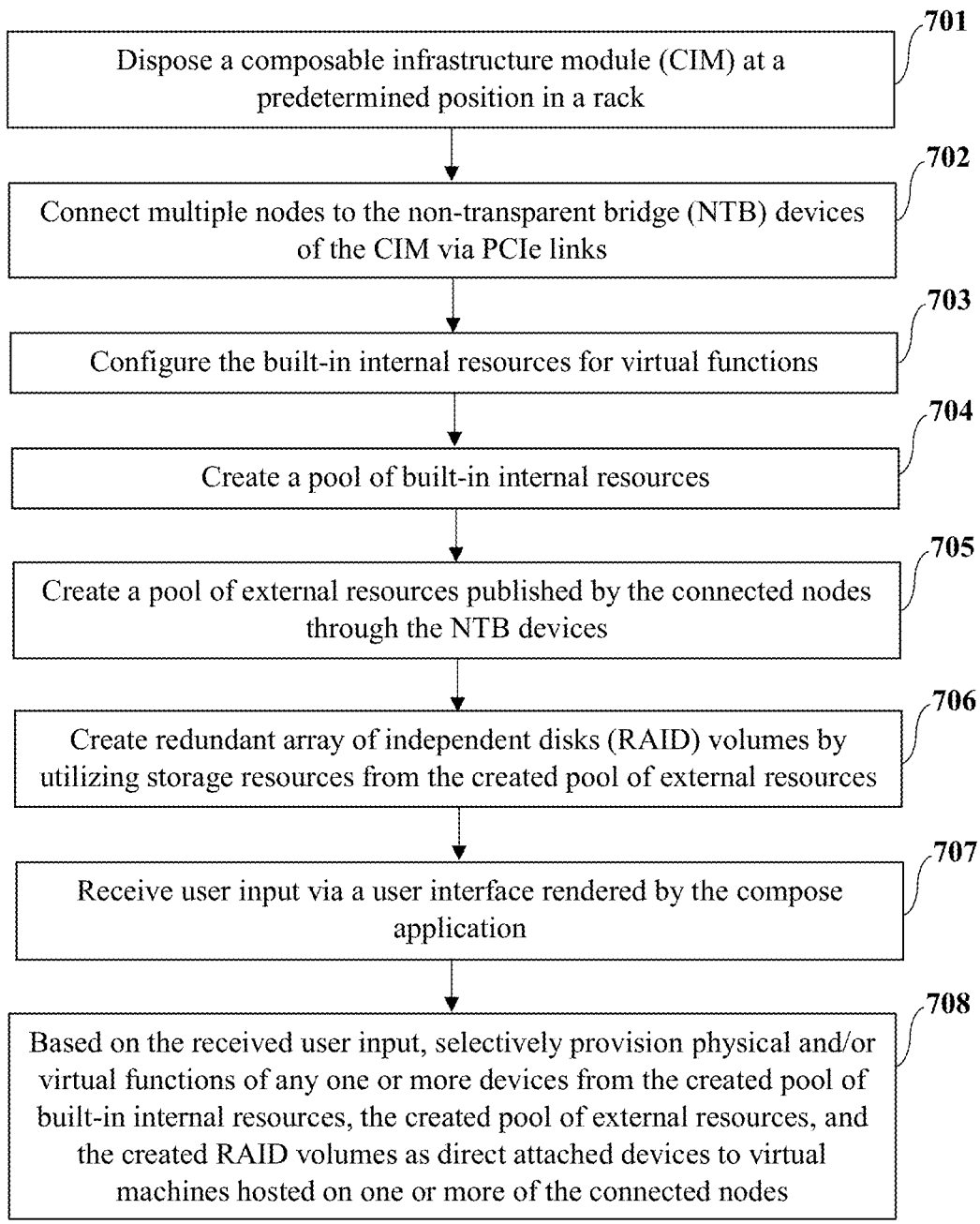
FIG. 7 illustrates a flowchart of an embodiment of a method for selectively provisioning physical and/or virtual functions of disaggregated compute, network, and storage resources as direct attached devices to multiple nodes in a data centre.

FIG. 7 illustrates a flowchart of an embodiment of a method for selectively provisioning physical and/or virtual functions of disaggregated compute, network, and storage resources as direct attached devices to multiple nodes in a data centre. In the method disclosed herein, the composable infrastructure module (CIM) comprising a processor, a memory unit, multiple non-transparent bridge (NTB) devices, an Ethernet switch function, multiple built-in resources, a compose application, and a volume manager module disclosed in the descriptions of FIGS. 1-6, is disposed 701 at a predetermined position in a rack, for example, at the top of the rack, in the data centre. Multiple nodes, for example, host servers, contained in the rack are connected 702 to the NTB devices of the CIM via peripheral component interconnect express (PCIe) links. The compose application configures 703 the built-in internal resources for virtual functions; creates 704 a pool of built-in internal resources; and creates 705 a pool of external resources published by the connected nodes through the NTB devices as disclosed in the description of FIG. 3. The built-in internal resources and the external resources constitute the disaggregated compute, network, and storage resources.

The volume manager module creates 706 redundant array of independent disks (RAID) volumes by utilizing storage resources from the created pool of external resources. The compose application awaits to receive 707 user input with a selection of any one or more devices for provisioning from the disaggregated compute, network, and storage resources, from a user. Based on the user input received via the user interface rendered by the compose application, the compose application selectively provisions 708 physical and/or virtual functions of any one or more devices from the created pool of built-in internal resources, the created pool of external resources, and the created RAID volumes as direct attached devices to virtual machines hosted on one or more of the connected nodes. The compose application also selectively provisions network virtual functions of the built-in network interface functions (NIFs) to the virtual machines of one or more of the connected nodes as direct attached network devices. In an embodiment, the volume manager module directly provisions the RAID volumes as direct attached storage devices, for example, non-volatile memory express (NVMe) storage devices, to virtual machines hosted on one or more of the connected nodes as disclosed in the description of FIG. 6. In an embodiment, the volume manager module composes each of the virtual functions of the NVME storage devices as RAID volumes, which can be allocated as direct attached devices to the nodes connected over the non-transparent bridge devices of the CIM.

Figure 8:
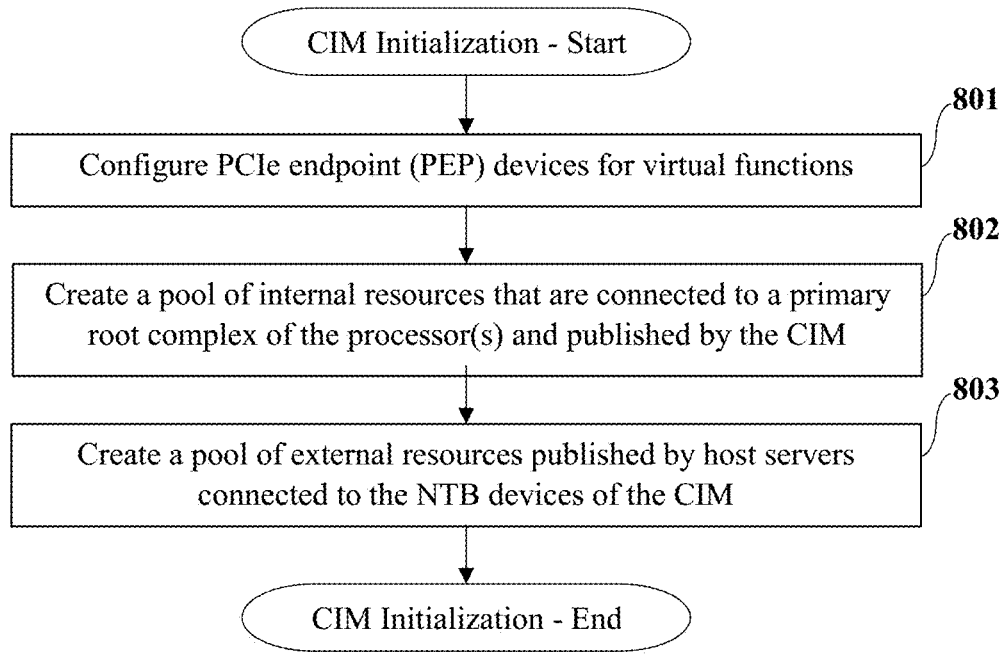
FIG. 8 illustrates a flowchart of an embodiment of a method for initializing the composable infrastructure module and pooling disaggregated compute, network, and storage resources.

FIG. 8 illustrates a flowchart of an embodiment of a method for initializing the composable infrastructure module (CIM) and pooling disaggregated compute, network, and storage resources. Booting up the CIM invokes a peripheral component interconnect express (PCIe) enumeration process and triggers the compose application to create a list of resources that are connected in the PCIe network and maintains the list in kernel data. During the PCIe enumeration process, the compose application discovers switch and endpoint devices that are connected to the CIM, determines the memory requirements, and then selectively configures the non-transparent bridge (NTB) ports of the relevant NTB devices. The list of resources comprises the resources within the CIM and the resources published by nodes connected to the PCIe ports of the CIM. The compose application utilizes the resource data that is collated during the bootup process and creates the resource pool list.

The process starts with the initialization of the CIM. Consider an example where the CIM comprises built-in internal resources, for example, network interface functions (NIFs); and peripheral component interconnect express (PCIe) endpoint (PEP) devices connected to the PCIe ports of the CIM. The PEP devices comprise, for example, any single-root-input/output virtualization (SR-IOV)-capable PCIe endpoint device connected to the PCIe ports of the CIM. Furthermore, in this example, multiple host servers are connected to other PCIe ports of the CIM through the NTB devices and PCIe cables. The host servers comprise central processing units (CPUs), graphics processing units (GPUs), and storage devices, herein referred to as external resources. When the CIM is initialized, the compose application operating in the CIM configures 801 the built-in PEP devices for virtual functions. The compose application then creates 802 a pool of internal resources comprising, for example, the NIFs that are built within the CIM, connected to a primary root complex device, for example, the PCIe root complex device, of the CPU of the CIM, and published by the CIM. The compose application then creates 803 a pool of external resources published by the host servers connected to the NTB devices of the CIM. The compose application provides a centralized directory service configured to maintain the created pools of internal resources and external resources as disaggregated compute, network, and storage resources.

Figure 9:
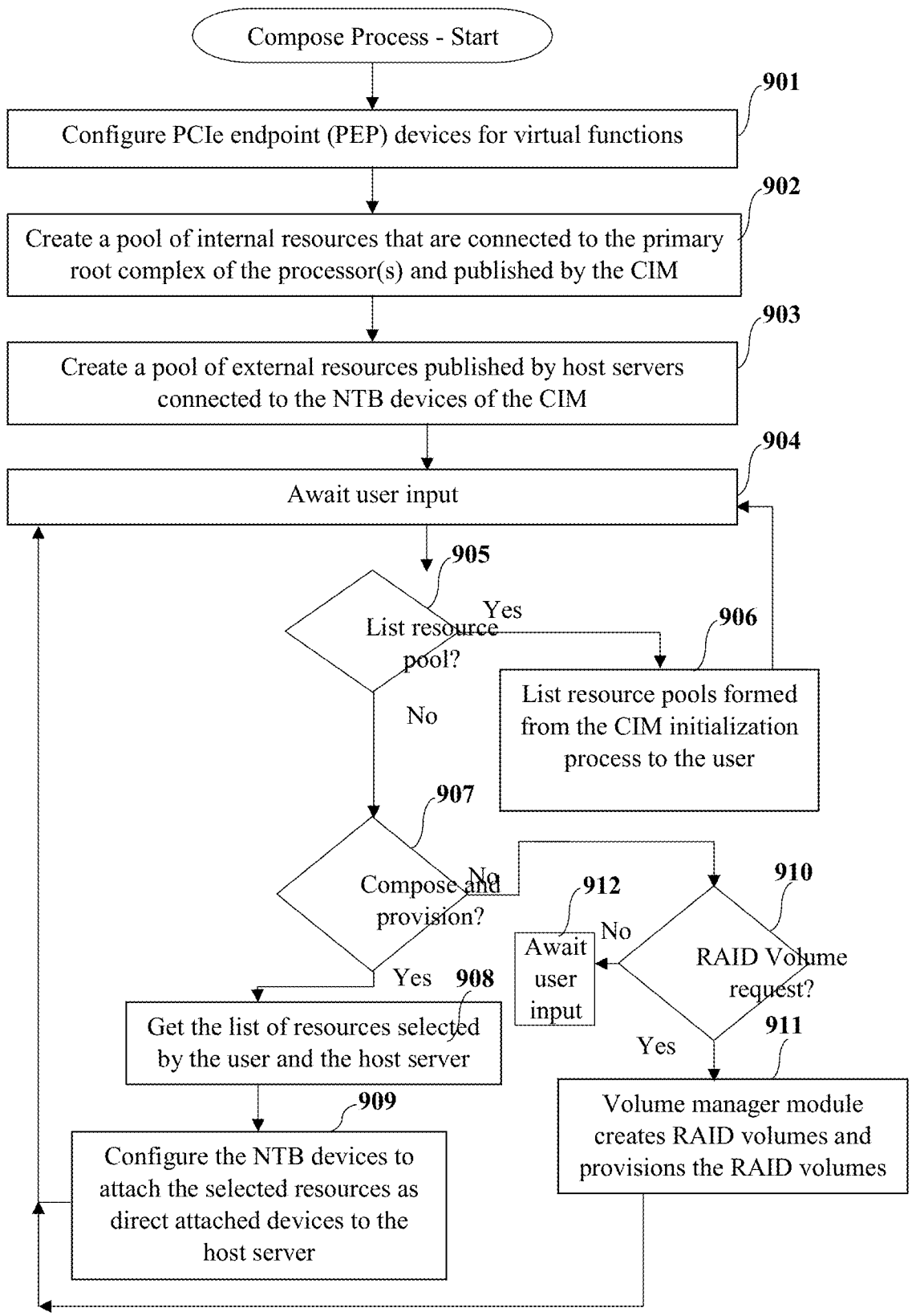
FIG. 9 illustrates a flowchart of an embodiment of a method for selectively provisioning physical and/or virtual functions of disaggregated compute, network, and storage resources and RAID volumes as direct attached devices to multiple nodes in a data centre.

FIG. 9 illustrates a flowchart of an embodiment of a method for selectively provisioning physical and/or virtual functions of disaggregated compute, network, and storage resources and redundant array of independent disks (RAID) volumes as direct attached devices to multiple nodes in a data centre. The nodes, for example, host servers, are connected to the composable infrastructure module (CIM) via peripheral component interconnect express (PCIe) links. In the method disclosed herein, the CIM is initialized as follows. The compose application operating in the CIM configures 901 built-in PCIe endpoint (PEP) devices for virtual functions. The compose application then creates 902 a pool of internal resources that are connected to the primary root complex device of the processor(s) and published by the CIM. The compose application then creates 903 a pool of external resources published by the host servers connected to the non-transparent bridge (NTB) devices of the CIM. The compose application renders a user interface for receiving a selection of devices that need to be provisioned on one or more of the host servers, from a user, and awaits 904 user input. The compose application determines 905 whether the user requests for a list of the resource pools. If the user requests for the list of the resource pools, the compose application lists 906 the resource pools formed from the CIM initialization process and comprising all the resources within the CIM and the resources published by the external host servers connected through the NTB devices, to the user via the user interface and awaits 904 further user input. If the user does not request for the list of the resource pools, the compose application determines 907 whether the user requests to initiate a compose and provision process on a list of selected devices from the resource pools created by the CIM. If the user requests to initiate the compose and provision process, the compose application gets 908 the list of resources selected by the user and a selection of the host server onto which the resources are to be provisioned. The compose application then configures 909 the NTB devices to attach the selected resources as direct attached devices to the selected host server, and proceeds to await 904 further user input. If the user does not request to initiate the compose and provision process, the compose application determines 910 whether the user requests for provisioning of RAID volumes to a selected host server. If the user requests for RAID volume provisioning, the volume manager module creates 911 the RAID volumes, provisions the RAID volumes on the selected host server, and proceeds to await 904 further user input. If these is no RAID volume provisioning request, the compose application proceeds to await 912 user input.

Figure 10:
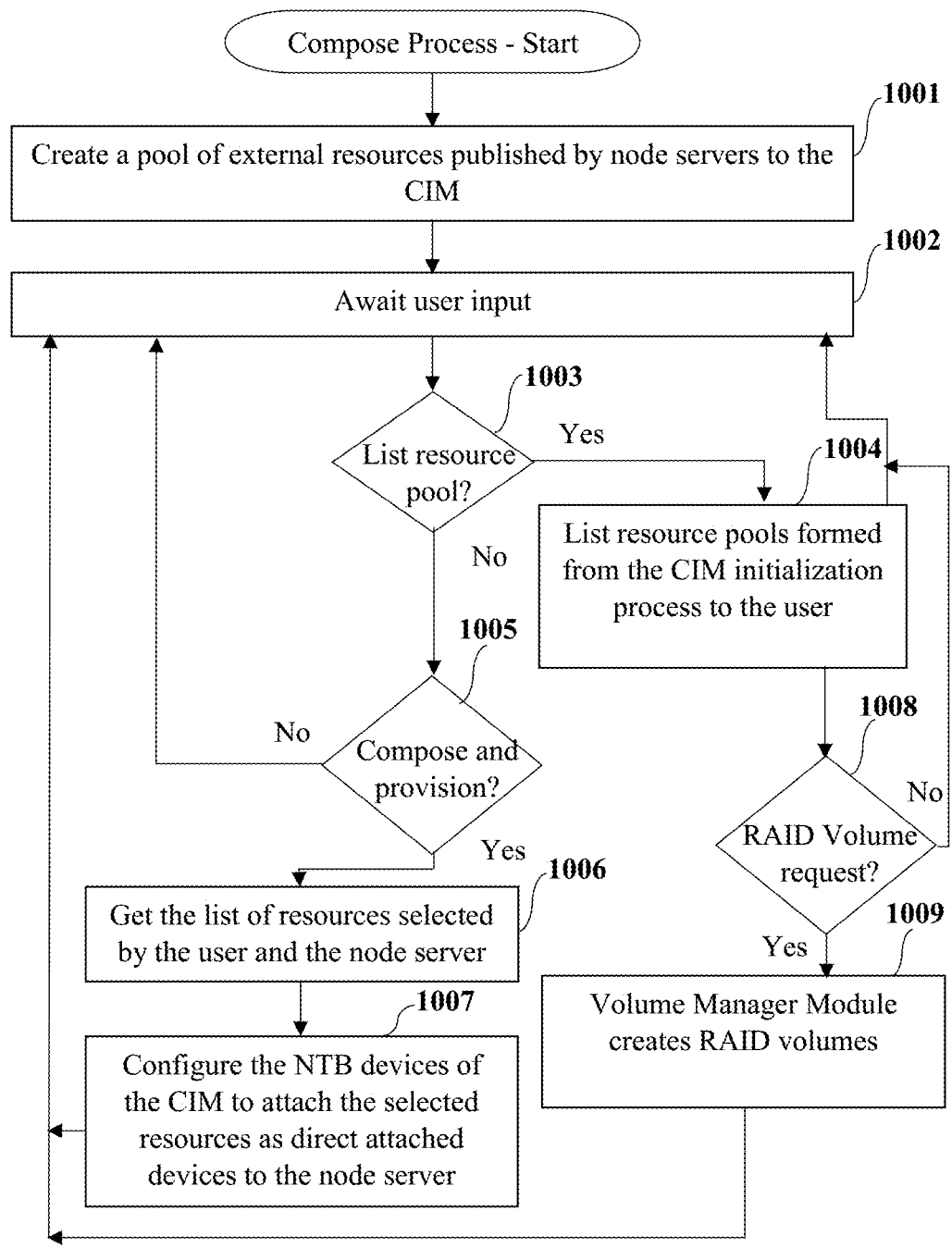
FIG. 10 illustrates a flowchart of another embodiment of a method for selectively provisioning physical and/or virtual functions of disaggregated compute, network, and storage resources and RAID volumes as direct attached devices to multiple node servers in a data centre.

FIG. 10 illustrates a flowchart of another embodiment of a method for selectively provisioning physical and/or virtual functions of disaggregated compute, network, and storage resources and redundant array of independent disks (RAID) volumes as direct attached devices to multiple node servers in a data centre. The node servers are connected to the composable infrastructure module (CIM) via peripheral component interconnect express (PCIe) links. In the method disclosed herein, the CIM is initialized as follows. The compose application operating in the CIM creates 1001 a pool of external resources comprising, for example, graphics processing units (GPUs), co-processors, storage devices, etc., published by the node servers to the CIM. The compose application renders a user interface for receiving a selection of devices that need to be provisioned on one or more of the node servers, from a user, and awaits 1002 user input. The compose application determines 1003 whether the user requests for a list of resource pools. If the user requests for a list of the resource pools, the compose application lists 1004 the resource pools formed from the CIM initialization process to the user via the user interface and awaits 1002 further user input.

Furthermore, the compose application determines 1008 whether the user requests for creation of RAID volumes. If the user requests for RAID volume creation, the volume manager module creates 1009 the RAID volumes using storage resources from the created resource pool, and proceeds to await 1002 further user input. If there is no RAID volume provisioning request, the compose application awaits 1002 user input again. If the user does not request for a list of the resource pools, the compose application determines 1005 whether the user requests to initiate a compose and provision process on a list of selected devices from the resource pool created by the CIM. If the user requests to initiate the compose and provision process, the compose application gets 1006 the list of resources selected by the user and a selection of the node server onto which the resources are to be provisioned. The compose application then configures 1007 the non-transparent bridge (NTB) devices of the CIM to attach the selected resources as direct attached devices to the selected node server and proceeds to await 1002 further user input. If the user does not request to initiate the compose and provision process, the compose application proceeds to await 1002 user input.

Consider an example for selectively provisioning virtual functions of disaggregated compute, network, and storage resources as direct attached devices to multiple host servers, for example, host server 1, host server 2, and host server 3 exemplarily illustrated in FIG. 3, in a data centre using the composable infrastructure module (CIM) disclosed herein. In this example, the host servers attach to the CIM through their respective adapters. The driver software module that runs in each of the host servers publishes a list of resources that can be shared by the corresponding host server through the respective adapters to the compose application running in the CIM. The compose application running in the central processing unit (CPU) board of the CIM uses the list of resources published by the host servers to create a pool of resources that can be provisioned to the virtual machines on the host servers. The CPU board provides the user interface, for example, a graphical user interface (GUI) or a command line interface (CLI) that can be used by a user, for example, an administrator of the CIM, to compose the required infrastructure using the pool of resources collated by the compose application. Based on the administrator's request to compose the infrastructure, the compose application running in the CPU allocates and provisions resources, for example, graphics processing units (GPUs), network interface functions (NIFs), and storage resources from the created pool to the virtual machines on the host servers connected to the PCIe ports as direct attached devices by programming the registers of the appropriate adapters connected to the host servers.

The compose application running in the CPU of the composable infrastructure module (CIM) collates a list to form a pool of resources, for example, graphics processing unit (GPU), storage, and network resources of different types. The administrator uses CLI commands or the GUI to compose the required infrastructure by provisioning virtual GPUs (vGPUs), storage, and non-volatile memory express (NVMe) virtual functions to the host servers. Consider an example where the administrator wants to provision three vGPUs and two NVMe virtual functions as direct attached devices to a virtual machine on a host server 1. Using the GUI or the CLI provided for composing infrastructure, the administrator requests for a list of vGPUs and NVMe virtual functions available from the resource pool. The administrator selects three vGPUs and two NVMe virtual functions from the available list and provisions the selected vGPUs and the selected NVMe virtual functions to the virtual machine on the host server 1, for example, using GUI controls or appropriate CLI commands provided. On receiving the user input from the administrator, the compose application identifies the relevant non-transparent bridge (NTB) devices that are connected to the host servers that provide the vGPUs and the NVMe virtual functions. The compose application programs the NTB device attached to the host server 1 and the associated NTB devices that provide the three vGPUs and the two NVME virtual functions to map memory windows for the three vGPUs and the two NVMe virtual functions to be direct attached devices to the virtual machines on the host server 1.

Consider another example of provisioning devices between two host servers, host server 2 and host server 3, where the host server 2 provides storage resources. In this example, the administrator wants to provision four vGPUs and one terabyte (1 TB) of disk storage that is hosted by the host server 2 as direct attached devices to a virtual machine on the host server 3. Using the GUI or the CLI provided for composing infrastructure, the administrator requests for a list of vGPUs, storage, and non-volatile memory express (NVMe) virtual functions available, from the resource pool. The administrator selects four vGPUs from the available list and also selects 1 TB of disk space published by the host server 2 and provisions the selected vGPUs and 1 TB of disk space to the virtual machine on the host server 3 using the GUI controls or appropriate CLI commands provided. The compose application programs the non-transparent bridge (NTB) device attached to the host server 3 and the NTB device that is connected to the host server 2 that provides the vGPUs to map the memory windows for the four vGPUs to be direct attached devices to the virtual machines on the host server 3. The compose application also programs the NTB devices connected to the host server 2 and the host server 3 to map the memory windows for the 1 TB disk space to appear as a direct attached disk to the host server 3.

Consider an example for provisioning redundant array of independent disks (RAID) volumes as direct attached disks to host servers in a data centre using the volume manager module of the composable infrastructure module (CIM). In this example, the administrator wants to provision one RAID volume of one terabyte (1 TB) as a direct attached disk to a virtual machine on the host server 1. Using the GUI or the CLI provided for composing infrastructure, the administrator requests for a list of storage resources available, from the resource pool. The administrator selects required published solid-state drives (SSDs) to create a RAID volume of 1 TB using a user interface provided by the volume manager module and provisions the RAID volume to the virtual machine on the host server 1 using the GUI controls or appropriate CLI commands provided. The compose application running on the CPU board programs the relevant non-transparent bridge (NTB) devices to map the memory windows for the RAID volume virtual functions to be direct attached devices to the virtual machine on the host server 1.

Figure 11:
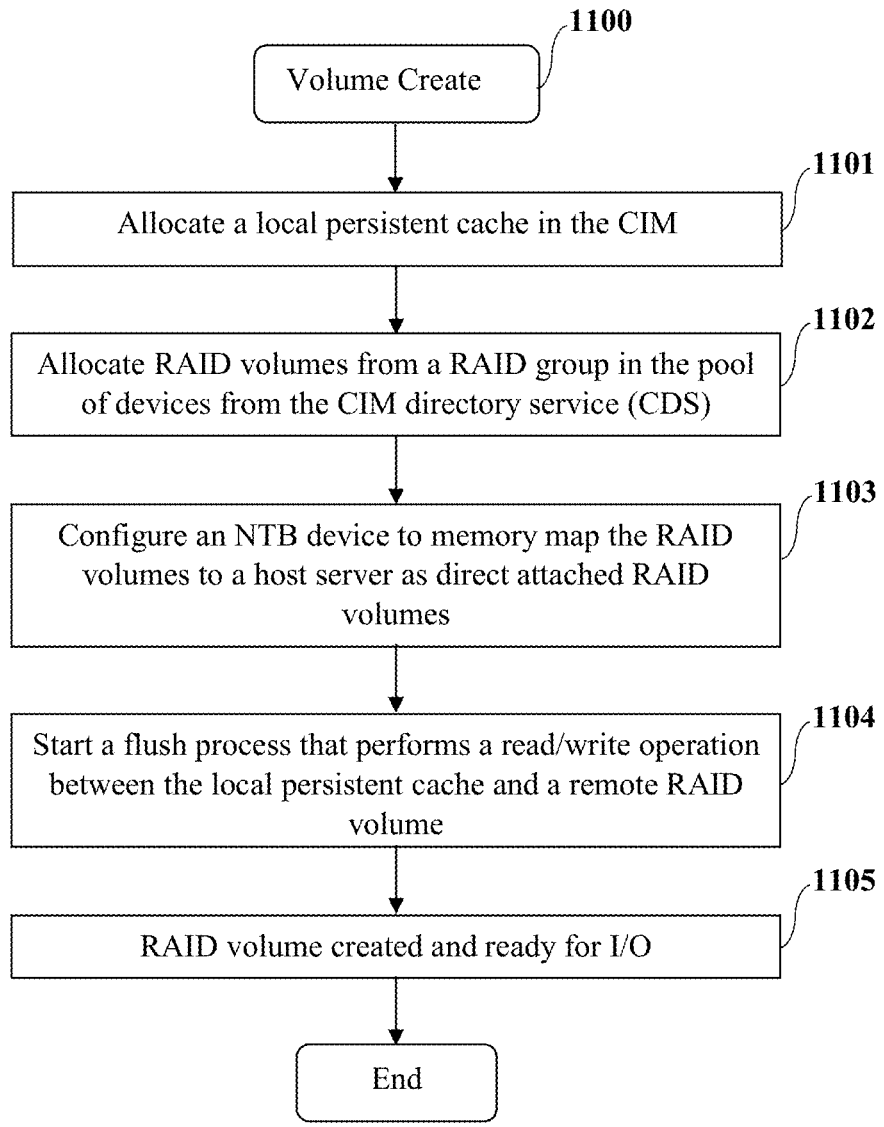
FIG. 11 illustrates a flowchart of a method for creating a RAID volume using a volume manager module of the composable infrastructure module.

FIG. 11 illustrates a flowchart of a method for creating a redundant array of independent disks (RAID) volume using the volume manager module of the composable infrastructure module (CIM). When a user requests for a RAID volume, the volume manager module creates the RAID volume from a storage pool RAID group listed in the CIM directory service (CDS). The CIM comprises a local persistent non-volatile memory express (NVMe) cache that is multi-partitioned. The volume manager module allocates one partition of the NVMe cache for each RAID volume created at the CIM based on the user input to create the RAID volume. When the RAID volumes are created, the compose application configures the non-transparent bridge (NTB) devices of the CIM to memory map the partitions to the created RAID volumes in host servers. Any read or write operations by the volume manager module is written first in the local persistent NVMe cache and then is flushed into the RAID volumes of a host server. A flush process running in the CIM performs a flushing operation into the RAID volumes of the host server. The compose application and/or the volume manager module attach the RAID volume to the requesting host server as a direct attached device by configuring the NTB device interfacing between the CIM and the host server.

As illustrated in FIG. 11, the volume manager module initiates the RAID volume creation process 1100. The volume manager module allocates 1101 a local persistent cache, for example, the local persistent non-volatile memory express (NVMe) cache, in the CIM. The volume manager module allocates 1102 RAID volumes from the RAID group in the pool of devices from the CIM directory service (CDS) to partitions of the local persistent NVMe cache. The compose application, in communication with the volume manager module, configures 1103 the non-transparent bridge (NTB) device to memory map the RAID volumes to a host server as direct attached RAID volumes. The volume manager module starts 1104 a flush process that performs a read/write operation between the local persistent NVMe cache and a remote RAID volume, thereby creating 1105 a RAID volume that is ready for input/output (I/O) operations.

Figure 12:
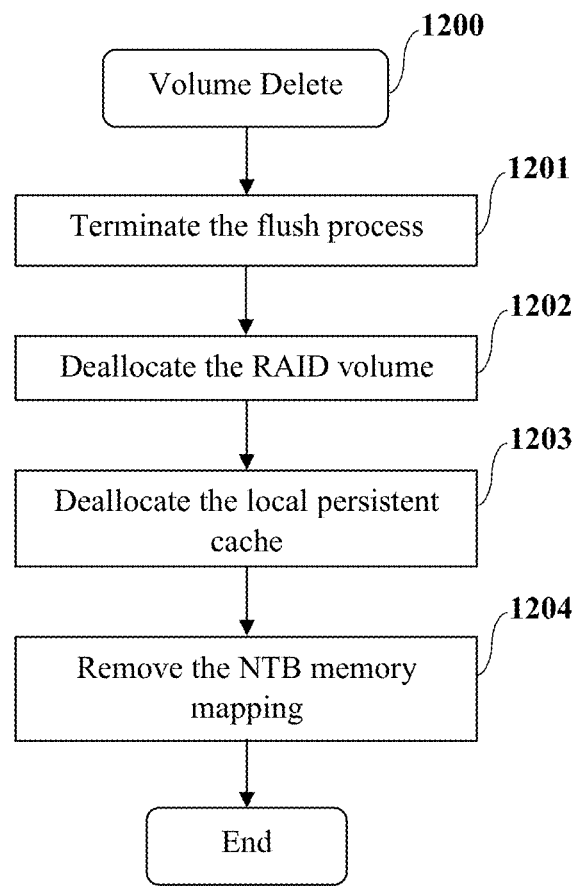
FIG. 12 illustrates a flowchart of a method for deleting a RAID volume using the volume manager module of the composable infrastructure module.

FIG. 12 illustrates a flowchart of a method for deleting a redundant array of independent disks (RAID) volume using the volume manager module of the composable infrastructure module (CIM). The volume manager module initiates the RAID volume deletion process 1200. The volume manager module terminates 1201 the flush process running in the CIM. The volume manager module deallocates 1202 the RAID volume from a corresponding partition of the local persistent non-volatile memory express (NVMe) cache. The volume manager module then deallocates 1203 the local persistent NVMe cache. The compose application, in communication with the volume manager module, removes 1204 the non-transparent bridge (NTB) memory mapping.

Figure 13:
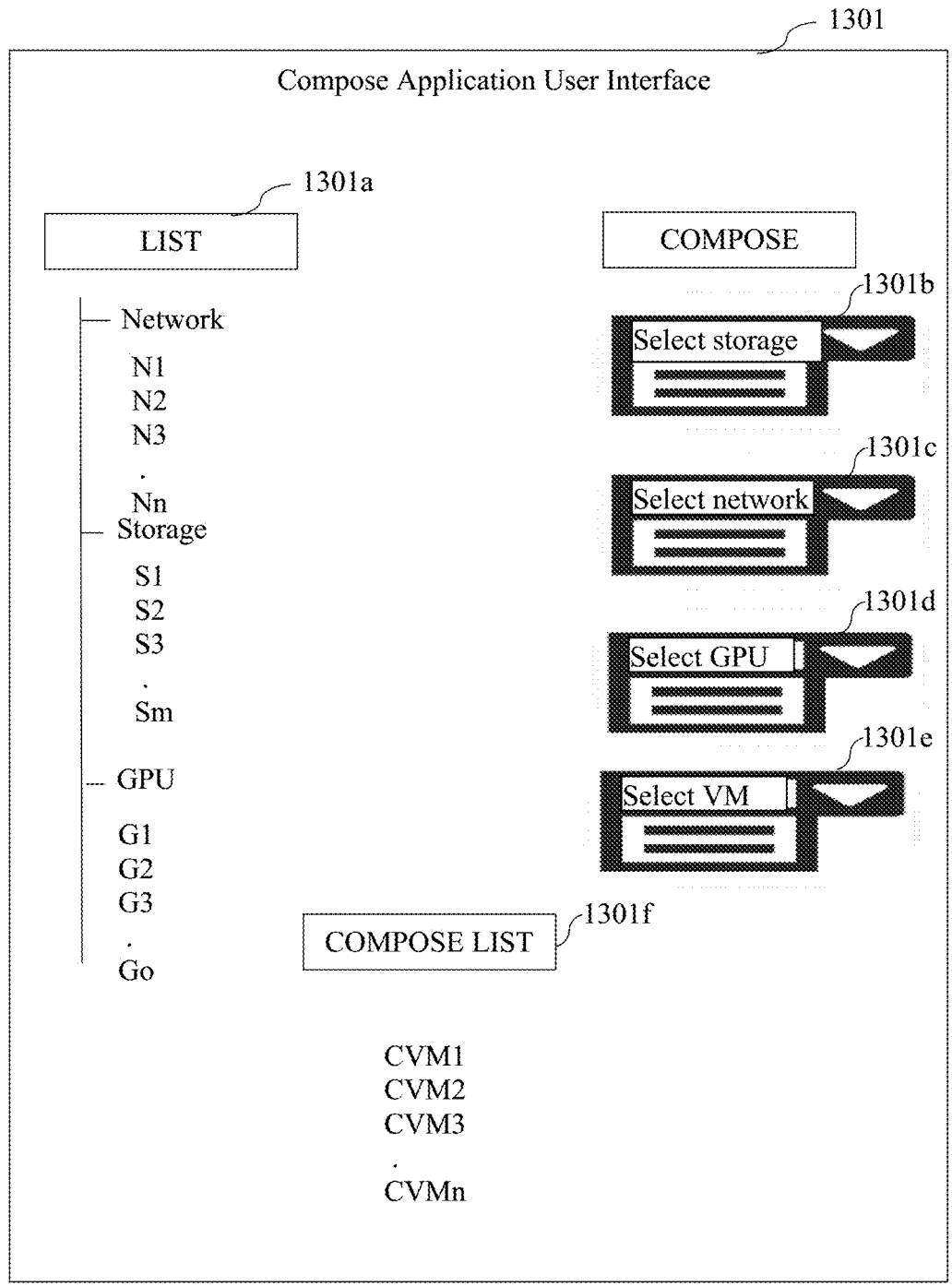
FIG. 13 illustrates an exemplary graphical user interface rendered by the compose application of the composable infrastructure module for selectively provisioning disaggregated compute, network, and storage resources and RAID volumes on nodes as direct attached devices.

FIG. 13 illustrates an exemplary graphical user interface (GUI) 1301 rendered by the compose application 112 of the composable infrastructure module (CIM) 100 shown in FIG. 3, for selectively provisioning disaggregated compute, network, and storage resources and redundant array of independent disks (RAID) volumes on nodes as direct attached devices. The compose application 112 renders a list 1301a of the resource pools comprising, for example, network resources N1, N2, N3, . . . , Nn, storage resources S1, S2, S3 . . . . Sm, and graphics processing units (GPUs) G1, G2, G3, . . . , Go on the GUI 1301 as exemplarily illustrated in FIG. 13. The GUI 1301 renders user interface elements, for example, dropdown menus 1301b, 1301c, 1301d, and 1301e, to allow a user to select storage resources, network resources, GPUs, virtual machines, respectively, etc., from the resource pools for provisioning on the nodes. The GUI 1301 also displays a list 1301f of composed virtual machines, for example, CVM1, CVM2, CVM3, . . . , CVMn to allow the user to list the details of composed virtual machines or to de-provision the composed virtual machines from the nodes.

The composable infrastructure module (CIM) converges multi-functionality silicons and devices within an appliance and makes the functionalities of these devices available to be provisioned on connected nodes as direct attached devices on demand. Converging multiple silicons inside the CIM and operating them in tandem creates an appearance of the silicons being physically present in the connected nodes rather than their actual physical presence in the CIM. The CIM converges all devices and peripheral component interconnect express (PCIe) endpoints physically and logically, which are then shared to connected nodes over a non-transparent bridge. The architecture of the CIM implements device sharing which provides a combined functionality of composability of infrastructure and a top-of-rack (ToR) switch feature within a data centre. The CIM disclosed herein replaces a conventional ToR Ethernet switch in a rack of a data centre. By replacing the conventional ToR Ethernet switch with the CIM disclosed herein, PCIe to Ethernet conversion and vice versa and related processing are removed for communication and data sharing between compute, graphics processing unit (GPU), and storage devices, which reduces latency for movement of data across the nodes within the rack. In the architecture disclosed herein, wider bandwidth PCIe connectivity provided between the CIM and multiple nodes contained in the rack through PCIe links replaces conventional Ethernet connectivity provided by Ethernet cables, thereby eliminating the need for Ethernet host bus adapter cards in the nodes and reducing physical hardware in the rack, which reduces cost, power, thermals, and software overhead.

All communications between the nodes within the same rack are executed through the PCIe links. The composable infrastructure module (CIM) integrates network interface functions (NIFs) therewithin, which provide network virtual functions that can be provisioned to nodes as direct attached network virtual functions through the built-in non-transparent bridge (NTB) devices of the CIM. The CIM allows the network virtual functions from built-in NIFs in the CIM to be provisioned as direct attached network devices to virtual machines on the nodes of the rack. The ability of the CIM to provide network connectivity to the virtual machines in the nodes further obviates the need for Ethernet host bus adapter cards in the nodes. In the architecture disclosed herein, the nodes can publish their own PCIe devices, for example, graphics processing units (GPUs), storage devices, redundant array of independent disks (RAID) controllers, field programmable gate arrays (FPGAs), co-processors, etc., to the CIM. The CIM also integrates the Ethernet switch function within its software for providing external Ethernet connectivity to the spine layer. The Ethernet switch function, in communication with the compose application, executes private cloud management, in addition to providing top-of-rack (ToR) functionality. The Ethernet connectivity of the nodes with the Ethernet switch is provided by an internal connection between the built-in network interface functions (NIFs) and the Ethernet switch function and through the PCIe links connected between the CIM and the nodes. The built-in NIFs provides an Ethernet interface to the virtual machines of the nodes by providing network virtual functions from the NIFs.

Moreover, the compose application that runs in the CIM maintains a pool of PCIe endpoints, devices, resources, etc., published by the nodes connected to the CIM. The CIM hosts the volume manager module which provides RAID features, that is, RAID volume services, to the nodes in the rack. The volume manager module creates RAID volumes by utilizing storage resources from the resource pool created by the compose application. The volume manager module and/or the compose application allow the RAID volumes to be provisioned to the nodes of the rack as direct attached disks. Furthermore, by using the user interface provided by the compose application, a user can provision any device from the pool of resources, for example, published graphics processing units (GPUs), published non-volatile memory express (NVMe) devices, the built-in internal resources, RAID volumes, etc., as direct attached devices to the connected nodes in the rack. By provisioning the compute, network, and storage resources as direct attached devices, multiple layers of software are removed which results in reduction of compute, latency, power, cooling, and space requirements in the data centre. The CIM maintains a list of all resources, for example, GPUs, compute, network, and storage resources and provides a converged view of all resources in the rack to the user for composability. The user can provision resources as direct attached devices to the virtual machines based on availability, usage, and duration. The allocation and provisioning by the CIM substantially reduce the number of layers of software and hardware, thereby reducing compute power requirements and latency of device interaction. Furthermore, the architecture disclosed herein reduces the number of converged nodes required.

It is apparent in different embodiments that the various methods, algorithms, and computer-readable programs disclosed herein are implemented on non-transitory, computer-readable storage media appropriately programmed for computing devices. The non-transitory, computer-readable storage media participate in providing data, for example, instructions that are read by a computer, a processor, or a similar device. In different embodiments, the "non-transitory, computer-readable storage media" also refer to a single medium or multiple media, for example, a centralized database, a distributed database, and/or associated caches and servers that store one or more sets of instructions that are read by a computer, a processor, or a similar device. The "non-transitory, computer-readable storage media" also refer to any medium capable of storing or encoding a set of instructions for execution by a computer, a processor, or a similar device and that causes a computer, a processor, or a similar device to perform any one or more of the steps of the method disclosed herein. In an embodiment, the computer programs that implement the methods and algorithms disclosed herein are stored and transmitted using a variety of media, for example, the computer-readable media in various manners. In an embodiment, hard-wired circuitry or custom hardware is used in place of, or in combination with, software instructions for implementing the processes of various embodiments. Therefore, the embodiments are not limited to any specific combination of hardware and software. Various aspects of the embodiments disclosed herein are implemented in a non-programmed environment comprising documents created, for example, in a hypertext markup language (HTML), an extensible markup language (XML), or other format that render aspects of a user interface, for example, a graphical user interface (GUI), or perform other functions, when viewed in a visual area or a window of a browser program. Various aspects of the embodiments disclosed herein are implemented as programmed elements, or non-programmed elements, or any suitable combination thereof.

The embodiments disclosed herein are configured to operate in a network environment comprising one or more computers that are in communication with one or more devices via a network. In an embodiment, the computers communicate with the devices directly or indirectly, via a wired medium or a wireless medium such as the Internet, satellite internet, a local area network (LAN), a wide area network (WAN) or the Ethernet, or via any appropriate communications mediums or combination of communications mediums. Each of the devices comprises processors that are adapted to communicate with the computers. Each of the computers and the devices executes an operating system. While the operating system may differ depending on the type of computer, the operating system provides the appropriate communications protocols to establish communication links with the network. Any number and type of machines may be in communication with the computers. The embodiments disclosed herein are not limited to a particular computer system platform, processor, operating system, or network. The embodiments disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting of the present invention. Dimensions of various parts of the composable infrastructure module disclosed above are exemplary, and are not limiting of the scope of the embodiments herein. While the present invention has been described with reference to various illustrative implementations, drawings, and techniques, it is understood that the words, which have been used herein, are words of description and illustration, rather than words of limitation. Furthermore, although the present invention has been described herein with reference to particular means, materials, techniques, and implementations, the present invention is not intended to be limited to the particulars disclosed herein; rather, the present invention extends to all functionally equivalent structures, methods and uses, such as are within the scope of the appended claims. It will be understood by those skilled in the art, having the benefit of the teachings of this specification, that the present invention is capable of modifications and other embodiments may be effected and changes may be made thereto, without departing from the scope and spirit of the present invention.

I claim:

1. A composable infrastructure module comprising:
   at least one processor;
   a memory unit operably and communicatively coupled to the at least one processor and configured to store computer program instructions executable by the at least one processor;
   a plurality of non-transparent bridge devices configured to connect a plurality of nodes to the at least one processor, wherein each of the non-transparent bridge devices is configured to establish peripheral component interconnect express (PCIe) connectivity between the at least one processor and the connected nodes and between the connected nodes, and to transfer data therebetween;
   an Ethernet switch function executable by the at least one processor and configured to provide Ethernet connectivity to a spine switch in a data centre through one or more Ethernet interfaces;
   a plurality of built-in internal resources operably connected to the at least one processor, wherein the plurality of built-in internal resources and a plurality of external resources published by the connected nodes constitute disaggregated compute, network, and storage resources;
   a compose application defining computer program instructions, which when executed by the at least one processor, cause the at least one processor to selectively pool and extend availability of the disaggregated compute, network, and storage resources as direct attached devices on demand; and
   a volume manager module configured to define computer program instructions, which when executed by the at least one processor, cause the at least one processor to create redundant array of independent disks (RAID) volumes by utilizing disaggregated storage resources, wherein one or more of the computer program instructions defined by one of the compose application and the volume manager module, when executed by the at least one processor, cause the at least one processor to selectively provision the created RAID volumes to one or more of the connected nodes as direct attached disks based on user input.

2. The composable infrastructure module as claimed in claim 1, wherein one or more of the computer program instructions defined by the compose application, when executed by the at least one processor, cause the at least one processor to:
   configure the plurality of built-in internal resources for virtual functions;
   create a pool of the plurality of built-in internal resources operably connected to a PCIe root complex device of the at least one processor;
   create a pool of the plurality of external resources published by the connected nodes through the plurality of non-transparent bridge devices; and
   based on the user input received via a user interface rendered by the compose application, selectively provision functions of any one or more devices from the created pool of the plurality of built-in internal resources and the created pool of the plurality of external resources as direct attached devices to virtual machines hosted on one or more of the connected nodes.

3. The composable infrastructure module as claimed in claim 1, wherein the each of the non-transparent bridge devices is configured to execute a bridging function for establishing inter-domain communication between the composable infrastructure module and the plurality of nodes, and wherein the each of the non-transparent bridge devices is configured to electrically and logically isolate the plurality of nodes from each other, while allowing status and data exchange between the plurality of nodes and between the composable infrastructure module and the plurality of nodes.

4. The composable infrastructure module as claimed in claim 1, comprising network interface functions configured as part of the plurality of built-in internal resources, wherein one or more of the computer program instructions defined by the compose application, when executed by the at least one processor, cause the at least one processor to selectively provision the network interface functions to virtual machines of one or more of the connected nodes as direct attached network devices.

5. The composable infrastructure module as claimed in claim 1, wherein the compose application is configured as a private cloud management application configured to maintain the created pool of the plurality of built-in internal resources and the created pool of the plurality of external resources.

6. The composable infrastructure module as claimed in claim 1, wherein one or more of the computer program instructions defined by the compose application, when executed by the at least one processor, cause the at least one processor to selectively configure one or more of the plurality of non-transparent bridge devices to attach one or more of the disaggregated compute, network, and storage resources to one or more of the connected nodes as direct attached devices based on the user input.

7. The composable infrastructure module as claimed in claim 1, comprising a software-defined networking module configured to define computer program instructions, which when executed by the at least one processor, cause the at least one processor to configure and operate the Ethernet switch function.

8. The composable infrastructure module as claimed in claim 1, wherein one or more of the plurality of built-in internal resources and one or more of the plurality of external resources are configured to support single-root input/output virtualization (SR-IOV) and a plurality of virtual functions.

9. The composable infrastructure module as claimed in claim 1 configured as one of a top-of-rack (ToR) switch, a middle-of-row (MoR) switch, and an end-of-row (EoR) switch.

10. The composable infrastructure module as claimed in claim 1, wherein the plurality of nodes comprises central processing units, graphics processing units, network controllers, and storage devices enclosed in a rack, and wherein the plurality of nodes is configured to communicate with the composable infrastructure module disposed on top of the rack through PCIe links.

11. The composable infrastructure module as claimed in claim 1, wherein each of the plurality of nodes is deployed free of an Ethernet host bus adapter card and is configured to execute data communication with the composable infrastructure module free of conversion between a PCIe protocol and an Ethernet protocol.

12. A method for selectively provisioning physical and virtual functions of disaggregated compute, network, and storage resources as direct attached devices to a plurality of nodes in a data centre, the method comprising:

disposing a composable infrastructure module at a predetermined position in a rack, wherein the composable infrastructure module comprises:
at least one processor;
a plurality of non-transparent bridge devices operably coupled to the at least one processor, wherein each of the non-transparent bridge devices is configured to establish peripheral component interconnect express (PCIe) connectivity between the at least one processor and the connected nodes and between the connected nodes, and to transfer data therebetween;
an Ethernet switch function executable by the at least one processor and configured to provide Ethernet connectivity to a spine switch in the data centre through one or more Ethernet interfaces;
a plurality of built-in internal resources operably connected to the at least one processor, wherein the plurality of built-in internal resources and a plurality of external resources published by the plurality of nodes contained in the rack constitute the disaggregated compute, network, and storage resources;
a compose application defining computer program instructions stored in a memory unit and executable by the at least one processor for maintaining pools of the plurality of built-in internal resources and the plurality of external resources; and
a volume manager module defining computer program instructions stored in the memory unit and executable by the at least one processor;
connecting the plurality of nodes to the plurality of non-transparent bridge devices of the composable infrastructure module via PCIe links;
configuring, by the compose application, the plurality of built-in internal resources for virtual functions;
creating, by the compose application, a pool of the plurality of built-in internal resources;
creating, by the compose application, a pool of the plurality of external resources published by the connected nodes through the plurality of non-transparent bridge devices;
creating, by the volume manager module, redundant array of independent disks (RAID) volumes by utilizing storage resources from the created pool of the plurality of external resources; and
based on user input received via a user interface rendered by the compose application, selectively provisioning, by the compose application, the physical and virtual functions of any one or more devices from the created pool of the plurality of built-in internal resources, the created pool of the plurality of external resources, and the created RAID volumes as direct attached devices to virtual machines hosted on one or more of the connected nodes.

13. The method as claimed in claim 12, wherein the plurality of built-in internal resources comprises network interface functions, and wherein one or more of the computer program instructions defined by the compose application, when executed by the at least one processor, cause the at least one processor to selectively provision the network interface functions to the virtual machines of one or more of the connected nodes as direct attached network devices.

14. The method as claimed in claim 12, wherein the each of the non-transparent bridge devices is configured to execute a bridging function for establishing inter-domain communication between the composable infrastructure module and the plurality of nodes, and wherein the each of the non-transparent bridge devices is configured to electrically and logically isolate the plurality of nodes from each other, while allowing status and data exchange between the plurality of nodes and between the composable infrastructure module and the plurality of nodes.

15. The method as claimed in claim 12, wherein the composable infrastructure module is configured as one of a top-of-rack (ToR) switch, a middle-of-row (MoR) switch, and an end-of-row (EoR) switch, and wherein the plurality of nodes comprises central processing units, graphics processing units, network controllers, and storage devices enclosed in the rack, and wherein each of the plurality of nodes is deployed free of an Ethernet host bus adapter card and is configured to execute data communication with the composable infrastructure module free of conversion between a PCIe protocol and an Ethernet protocol.

* * * * *

UNITED STATES PATENT AND TRADEMARK OFFICE
CERTIFICATE OF CORRECTION

| | | |
|---|---|---|
| PATENT NO. | : 12,379,880 B2 | Page 1 of 1 |
| APPLICATION NO. | : 18/335182 | |
| DATED | : August 5, 2025 | |
| INVENTOR(S) | : Rajiv Ganth | |

It is certified that error appears in the above-identified patent and that said Letters Patent is hereby corrected as shown below:

On the Title Page

Add the following foreign priority information:
"Foreign Application Priority Data:
India – Application No. 202341038229, filed 03 June 2023."

Signed and Sealed this
Thirtieth Day of December, 2025

John A. Squires
*Director of the United States Patent and Trademark Office*